United States Patent
Yamanaka et al.

(10) Patent No.: US 8,292,782 B2
(45) Date of Patent: Oct. 23, 2012

(54) CONTROL APPARATUS FOR BELT-TYPE CONTINUOUSLY-VARIABLE TRANSMISSION

(75) Inventors: Tsuyoshi Yamanaka, Yamato (JP); Shigeru Ishii, Atsugi (JP); Shigeki Shimanaka, Hadano (JP)

(73) Assignees: Jatco Ltd, Fuji-shi (JP); Nissan Motor Co., Ltd., Yokohama-shi (JP)

( * ) Notice: Subject to any disclaimer, the term of this patent is extended or adjusted under 35 U.S.C. 154(b) by 397 days.

(21) Appl. No.: 12/641,040

(22) Filed: Dec. 17, 2009

(65) Prior Publication Data

US 2010/0160111 A1 Jun. 24, 2010

(30) Foreign Application Priority Data

Dec. 18, 2008 (JP) ................................ 2008-321749
Dec. 8, 2009 (JP) ................................ 2009-278116

(51) Int. Cl.
*F16H 61/00* (2006.01)
*F16H 61/662* (2006.01)
*F16H 59/74* (2006.01)
*B60W 10/10* (2012.01)

(52) U.S. Cl. ............. 477/45; 477/46; 477/102; 477/107

(58) Field of Classification Search .................... 477/45, 477/102
See application file for complete search history.

(56) References Cited

U.S. PATENT DOCUMENTS

| 6,409,627 | B2 * | 6/2002 | Bolz et al. | ....................... 477/46 |
| 2004/0063523 | A1 * | 4/2004 | Jozaki et al. | .................... 474/18 |
| 2004/0063539 | A1 * | 4/2004 | Endo et al. | ....................... 477/45 |
| 2005/0107195 | A1 | 5/2005 | Katou | |
| 2005/0192153 | A1 * | 9/2005 | Jozaki et al. | .................... 477/45 |

FOREIGN PATENT DOCUMENTS

JP 2005-147264 A 6/2005

* cited by examiner

*Primary Examiner* — Edwin A Young
(74) *Attorney, Agent, or Firm* — Foley & Lardner LLP

(57) ABSTRACT

A belt continuously-variable transmission control apparatus includes: a belt continuously-variable transmission including; a primary pulley arranged to receive a torque from a driving source; a secondary pulley arranged to output the torque to driving wheels; a belt wound around the primary pulley and the secondary pulley; a hydraulic pressure control section configured to control a hydraulic pressure of one of the primary pulley and the secondary pulley which is a capacity side, and thereby to bring the belt, the primary pulley and the secondary pulley to a slip state; and a torque control section configured to control the torque of the driving source, and thereby to bring the slip state to a predetermined slip state.

11 Claims, 21 Drawing Sheets

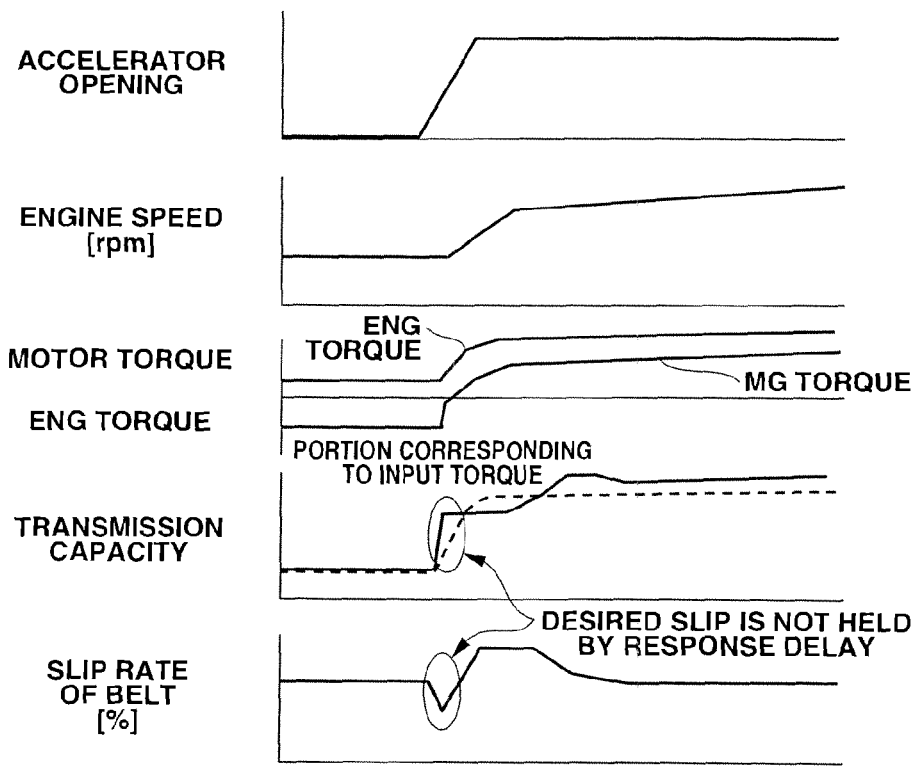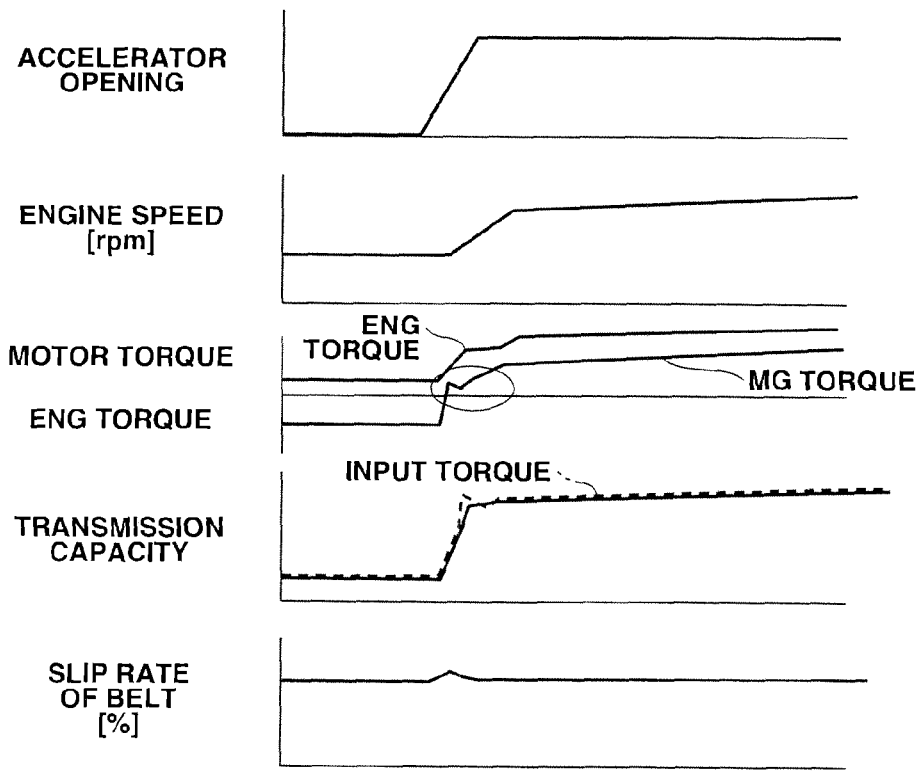

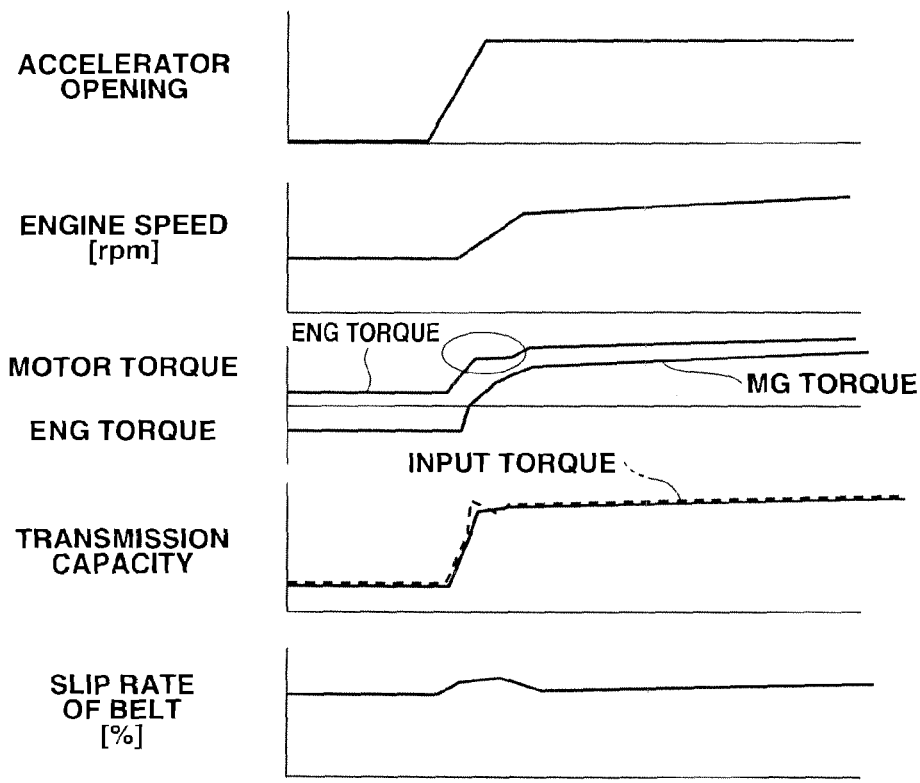
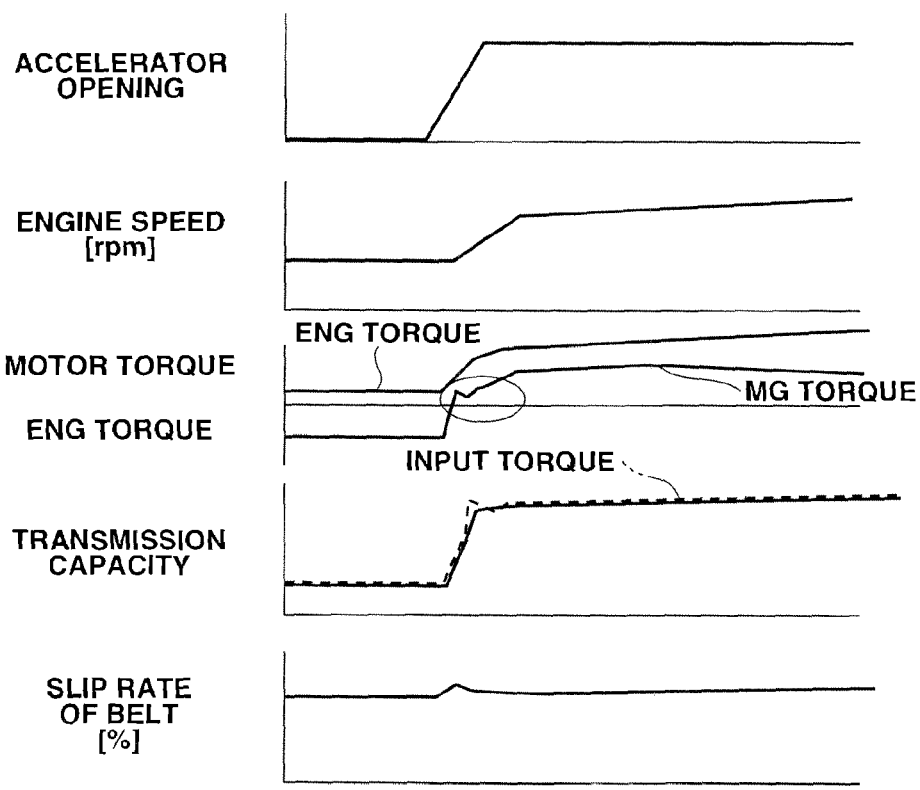

(ACTUAL TRANSMISSION GEAR RATIO BASED ON GROOVE WIDTH)
× (SECONDARY PULLEY ROTATIONAL SPEED)

(ACTUAL TRANSMISSION GEAR RATIO BASED ON GROOVE WIDTH)
× (SECONDARY PULLEY ROTATIONAL SPEED)

CONTROL APPARATUS FOR BELT-TYPE CONTINUOUSLY-VARIABLE TRANSMISSION

BACKGROUND OF THE INVENTION

This invention relates to a control apparatus for a belt-type continuously-variable transmission.

U.S. Patent Application Publication No. 2005-107195 (corresponding to Japanese Patent Application Publication No. 2005-147264) discloses a control apparatus for a belt-type continuously-variable transmission which is configured to control a hydraulic pressure so as to suppress a slip between a belt and pulleys.

SUMMARY OF THE INVENTION

However, the above-described belt-type continuously-variable transmission needs a high hydraulic pressure for suppressing the belt slippage. A pump friction becomes high, and accordingly it is difficult to improve fuel consumption.

It is an object of the present invention to provide a control apparatus for a belt-type continuously-variable transmission which is devised to solve the above mentioned problem, and to improve the fuel consumption.

According to one aspect of the present invention, a belt continuously-variable transmission control apparatus comprises: a belt continuously-variable transmission control apparatus comprises: a belt continuously-variable transmission including; a primary pulley arranged to receive a torque from a driving source; a secondary pulley arranged to output the torque to driving wheels; a belt wound around the primary pulley and the secondary pulley; a hydraulic pressure control section configured to control a hydraulic pressure of one of the primary pulley and the secondary pulley which is a capacity side, and thereby to bring the belt, the primary pulley and the secondary pulley to a slip state; and a torque control section configured to control the torque of the driving source, and thereby to bring the slip state to a predetermined slip state.

According to another aspect of the invention, a belt continuously-variable transmission control apparatus comprises: a belt continuously-variable transmission including; a primary pulley arranged to receive a torque from a driving source; a secondary pulley arranged to output the torque to driving wheels; a belt wound around the primary pulley and the secondary pulley; a target rotational speed calculating section configured to calculate a target rotational speed of the driving source to bring the belt and one of the primary pulley and the secondary pulley to a predetermined slip state; a rotational speed control section configured to control a rotational speed of the driving source to the target rotational speed; a capacity side pulley pressure setting section configured to set a hydraulic pressure of one of the primary pulley and the secondary pulley which is a capacity side, in accordance with a deviation between a desired torque and an actual torque of the driving source; and a shift control section configured to control a pressing force of the primary pulley and a pressing force of the secondary pulley based on the hydraulic pressure of the one of the primary pulley and the secondary pulley of the capacity side, and thereby to obtain a desired transmission gear ratio.

BRIEF DESCRIPTION OF THE DRAWINGS

FIG. 6 is a time chart when a hydraulic pressure adjusting type is employed.

FIG. 7 is a time chart showing a slip rate control operation in the first embodiment.

FIG. 8 is a time chart showing a slip rate control operation in a second embodiment of the present invention.

FIG. 9 is a time chart showing a slip rate control operation in a third embodiment of the present invention.

DETAILED DESCRIPTION OF THE INVENTION

Hereinafter, a belt-type continuously-variable transmission according to embodiments of the present invention are illustrated with reference to drawings.

Figure 1:
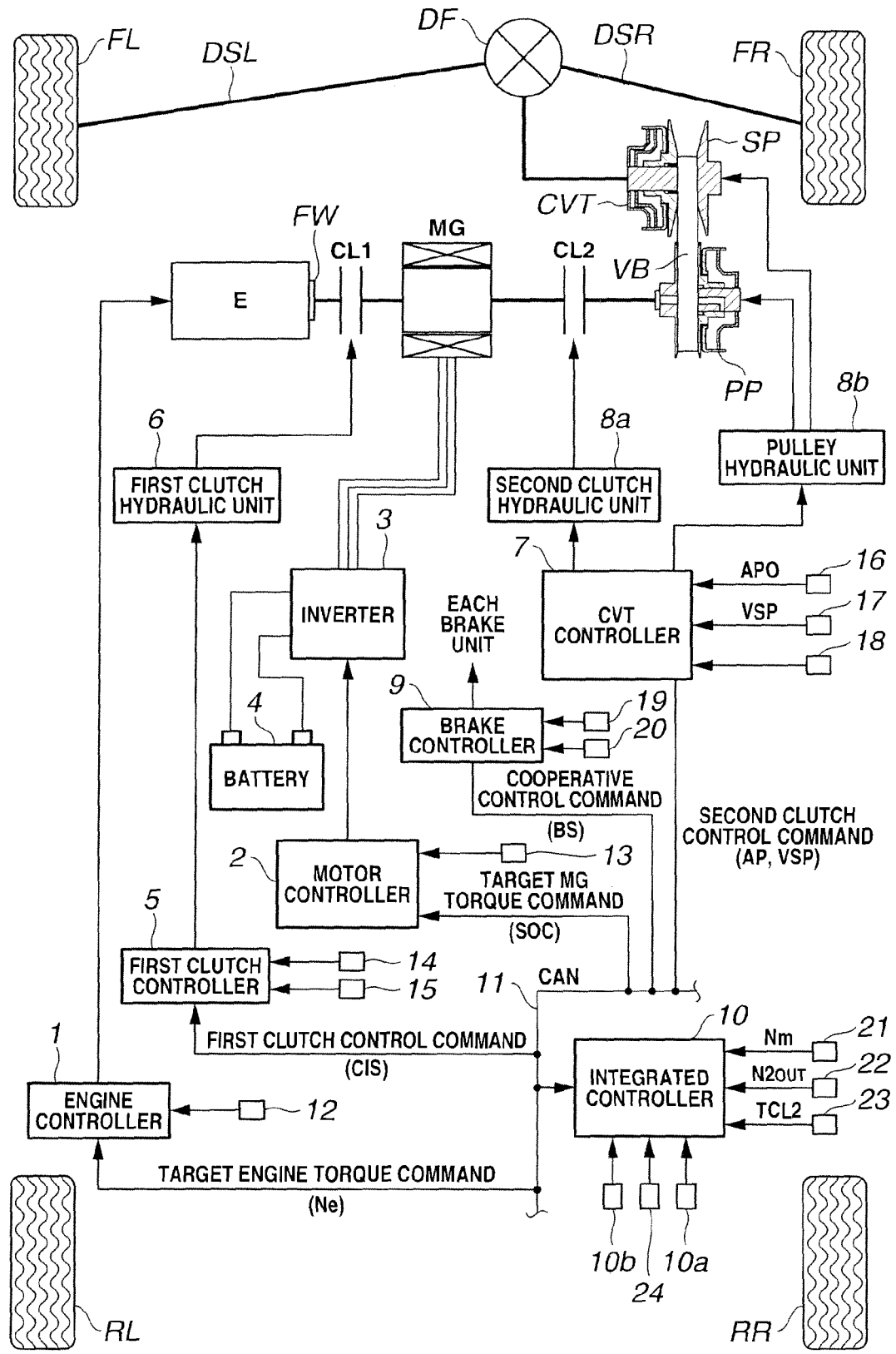
FIG. 1 is a schematic view showing a hybrid vehicle according to a first embodiment of the present invention.

First, a driving system of a hybrid vehicle is illustrated. FIG. 1 is a schematic diagram showing a front-wheel drive hybrid vehicle which employs a belt-type continuously-variable transmission according to the embodiments of the present invention. As shown in FIG. 1, the driving system includes an engine E, a first clutch CL1, a motor generator MG, a second clutch CL2, a belt-type continuously-variable transmission CVT, a differential DF, a left drive shaft DSL, a right drive shaft DSR, a left front wheel (driving wheel) FL, a right front wheel (driving wheel) FR, a left rear wheel RL and a right rear wheel RR.

Engine E is, for example, a gasoline engine. An ignition timing, valve openings of throttle valves and so on of engine E are controlled based on a control command from an engine controller 1 described later. A flywheel FW is provided to an engine output shaft.

First clutch CL1 is disposed between engine E and motor generator MG. First clutch CL1 is controlled to engage or disengage through slip engagement by a control hydraulic pressure produced by a first clutch hydraulic unit 6 based on a control command from a first clutch controller 5 described later.

Motor generator MG is a synchronous motor generator including a rotor having permanent magnets embedded in the rotor, and a stator having stator coils wound around the stator. Motor generator MG is controlled by being applied with three-phase alternating current (AC) produced by an inverter 3 based on a control command from a motor controller 2 described later. This motor generator MG serves as an electric motor arranged to rotate by receiving a supply of the electric power from a battery 4 (hereinafter, referred to as a power running), and serves as a generator arranged to generate an electromotive force between both ends of each stator coil when the rotor is rotated by the external force, and thereby to charge battery 4 (hereinafter, referred to as a regeneration). The rotor of motor generator MG is connected through a damper (not shown) to an input shaft of the belt-type continuously-variable transmission CVT.

Second clutch CL2 is disposed between motor generator MG and belt-type continuously-variable transmission CVT. Second clutch CL2 is controlled to engage or disengage through slip engagement by a control hydraulic pressure produced by a second clutch hydraulic unit 8a based on a control command from CVT controller 7 described later.

Belt-type continuously-variable transmission CVT includes a primary pulley PP arranged to receive a torque of engine E and/or a torque of motor generator MG; a secondary pulley SP arranged to output the torque to driving wheels FL, FR; and a belt VB wound around primary and secondary pulleys PP and SP. Belt-type continuously-variable transmission CVT is a well-known transmission. Belt-type continuously-variable transmission CVT varies a pulley groove width in accordance with a pulley hydraulic pressure supplied to each pulley by the hydraulic pressure control, and continuously varies a transmission gear ratio (reduction ratio) (in a stepless manner). A CVT controller 7 described later is configured to output a control command to automatically vary the transmission gear ratio (shift) in accordance with a vehicle speed, an accelerator opening and so on. The hydraulic pressure of primary pulley PP and the pressing force of secondary pulley SP are controlled by a control hydraulic pressure produced by a pulley hydraulic unit 8b based on this control command so as to vary the transmission gear ratio.

The belt-type continuously-variable transmission CVT employs a single pressure regulating method. The line pressure is always supplied to the secondary pulley SP. Moreover, belt-type continuously-variable transmission CVT includes a step motor (not shown). The hydraulic pressure of primary pulley PP is controlled in accordance with a position of the step motor, so as to attain a desired pulley groove width (transmission gear ratio). In the first embodiment, belt-type continuously-variable transmission CVT employs the single pressure regulating method, and employs a mechanical feedback system by using the step motor. The hydraulic pressure of the primary pulley PP may be regulated by a pressure regulating valve. Moreover, the belt-type continuously-variable transmission CVT may employ both pressure regulating method by using the step motor, and may employ the both pressure regulating method by using a plurality of pressure regulating valves. The belt-type continuously-variable transmission is not limited to employ the single pressure regulating method. In a case in which the belt-type continuously-variable transmission employs the both pressure regulating method, the line pressure is supplied to secondary pulley SP when the transmission gear ratio is a low side relative to 1, and the line pressure is supplied to primary pulley PP when the transmission gear ratio is a high side relative to 1, unlike the belt-type continuously-variable transmission according to the first embodiment. In this specification, the pulley to which the line pressure is supplied is referred as a pulley on a capacity side. In the first embodiment, the pulley on the capacity side is always the secondary pulley SP. However, in case of employing the other control methods, the pulley on the capacity side is the primary pulley in a first state, and the pulley on the capacity side is the secondary pulley in a second state.

An output shaft of belt-type continuously-variable transmission CVT is connected with left and right front wheels FL and FR through differential gear DF, left drive shaft DSL and right drive shaft DSR. Each of first and second clutches CL1 and CL2 is a wet-type multiple-plate clutch in which a hydraulic pressure and a flow rate of the hydraulic fluid can be continuously controlled by a proportional solenoid. However, each of first and second clutches CL1 and CL2 may be a dry-type clutch and so on. Each of first and second clutches CL1 and CL2 is not limited to the wet-type multiple-plate clutch.

This hybrid drive system includes an EV running mode, an HEV running mode, and a WSC running mode which are selected in accordance with the engagement and the disengagement of first clutch CL1. The EV running mode is an electric vehicle running mode which is a motor-use running mode in which the vehicle runs only by the motor generator MG in the disengagement state of first clutch CL1. The HEV running mode is an engine-use running mode in which the vehicle runs by the power source including engine E in the engagement state of first clutch CL1. The WSC running mode is an engine-use slipping running mode in which the vehicle runs by the power source including engine E in the engagement state of first clutch CL1 and in a slip state of second clutch CL2. In this WSC mode, the vehicle can perform a creep running especially when the battery SOC is low and the engine water temperature is low. When the vehicle shifts from the EV running mode to the HEV running mode, first clutch CL1 is engaged, and the engine starts by using the torque of motor generator MG.

The HEV running mode includes an engine running mode, a motor assist running mode, and an electric generation running mode. In the engine running mode, the driving wheels are driven by using engine E only as the power source. In the motor assist running mode, the driving wheels are driven by using engine E and motor generator MG as the power source. In the electric generation running mode, driving wheels FL and FR are driven by using engine E as the power source, and simultaneously motor generator MG is operated as the electric generator. In the constant speed running or in the acceleration running, motor generator MG is operated as the electric generator by using the power of engine E. In the deceleration running, motor generator MG regenerates the brake energy, and performs the electric generation to charge battery 4. Moreover, there is an electric generation mode in which motor generator MG is operated as the electric generator by using the power of engine E at the stop of the vehicle.

Next, the control system of the hydraulic vehicle is illustrated. As shown in FIG. 1, the control system of the hydraulic vehicle includes engine controller 1, motor controller 2, inverter 3, battery 4, first clutch controller 5, first clutch hydraulic unit 6, CVT controller 7, second clutch hydraulic unit 8a, a brake controller 9, and an integrated controller 10. Engine controller 1, motor controller 2, first clutch controller 5, CVT controller 7, brake controller 9 and integrated controller 10 are connected with each other through CAN communication lines (CAN lines) 11 capable of exchanging information with each other.

Engine controller 1 receives information (signal) of an engine speed from an engine speed sensor 12. Engine controller 1 outputs a command to control an engine operating point (Ne: engine speed, Te: engine torque) in accordance with a target engine torque command and so on from integrated controller 10, to an ignition timing control actuator (not shown), a throttle valve actuator (not shown) and so on. The information of engine speed Ne and so on is supplied through CAN communication lines 11 to integrated controller 10.

Motor controller 2 receives information (signal) from a resolver 13 configured to sense a rotary position of the rotor of motor generator MG. Motor controller 2 outputs, to inverter 3, a command to control a motor operating point of motor generator MG (Nm: motor generator rotational speed, Tm: motor generator torque) in accordance with a target motor generator torque command and so on from integrated controller 10. This motor controller 2 monitors a battery SOC indicative of a charge state of battery 4. The information of battery SOC is used as the information for controlling motor generator MG, and supplied through CAN communication lines 11 to integrated controller 10.

First clutch controller 5 receives sensor information (signals) from a first clutch hydraulic sensor 14 and a first clutch stroke sensor 15. First clutch controller 5 outputs, to first clutch hydraulic unit 6, a command to control the engagement/disengagement of first clutch CL1 in accordance with a first clutch control command from integrated controller 10. The information of first clutch stroke C1S is supplied through CAN communication lines 11 to integrated controller 10.

CVT controller 7 receives sensor information (signals) from an accelerator opening sensor 16, a vehicle speed sensor 17, and a second clutch hydraulic pressure sensor 18, and an inhibitor switch arranged to output a signal corresponding to a position of a shift lever. CVT controller 7 outputs, to second clutch hydraulic unit 8a in a CVT hydraulic pressure control valve, a command to control the engagement/disengagement of second clutch CL2 in accordance with a second clutch control command from integrated controller 10. CVT controller 7 has a transmission gear ratio map to determine a target transmission gear ratio based on the vehicle speed VSP and the accelerator opening APO. CVT controller 7 determines the target transmission gear ratio based on the inputted sensor information. Moreover, CVT controller 7 determines the line pressure and the secondary pulley hydraulic pressure in accordance with a transmission capacity command or transmitting capacity command from integrated controller 10. CVT controller 7 outputs a step motor driving command to pulley hydraulic unit 8b to obtain a pulley groove width to attain the target transmission gear ratio. The information of the inhibitor switch, accelerator opening APO, and vehicle speed VSP are supplied through CAN communication lines 11 to integrated controller 10.

Brake controller 9 receives sensor information (signals) from wheel speed sensors 19 each arranged to sense a wheel speed of one of the four wheels, and a brake stroke sensor 20. When a desired braking force determined from a brake stroke BS is not satisfied only by the regenerative braking force at a braking performed by compression of a brake pedal, brake controller 9 performs a regenerative cooperative brake control based on a regenerative cooperative control command from integrated controller 10 to compensate deficiency of the braking force by a mechanical braking force (the brake force by the frictional brake).

Integrated controller 10 monitors energy consumption of the entire of the vehicle, and operates to run the vehicle at peak efficiency (maximum efficiency). Integrated controller 10 receives information (signal) from a motor rotational speed sensor 21 arranged to sense a motor rotational speed Nm, information (signal) from a second clutch output rotational speed sensor 22 arranged to sense a second clutch output rotational speed N2out, information (signal) from a second clutch torque sensor 23 arranged to sense a second transmission torque capacity TCL2, information (signal) from a brake hydraulic pressure sensor 24, information (signal) from a transmission gear ratio sensor 10a arranged to sense an actual transmission gear ratio from a pulley groove width, information (signal) from a secondary rotational speed sensor 10b arranged to sense a rotational speed of secondary pulley SP, and information (signals) obtained through CAN communication lines 11.

Integrated controller 10 controls engine E by the control command to engine controller 1, and controls motor generator MG by the control command to motor generator 2. Integrated controller 10 controls the engagement and the disengagement of first clutch CL1 by the control command to first clutch controller 5, and controls the engagement, the disengagement and the transmission (transmitting) capacity of second clutch CL2 by the control command to CVT controller 7.

Figure 2:
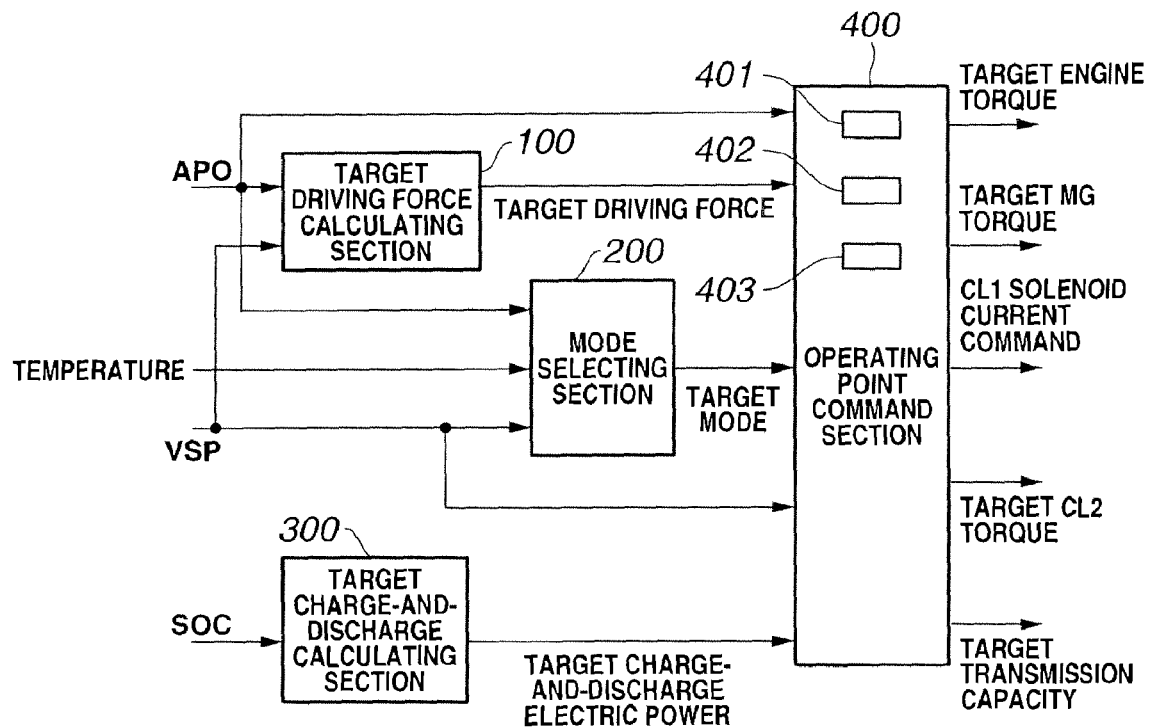
FIG. 2 is a control block diagram showing a calculation program in an integrated controller in the first embodiment.

Hereinafter, the control calculation performed in integrated controller 10 in the first embodiment is illustrated with reference to the block diagram shown in FIG. 2. For example, integrated controller 10 performs this calculation at a control cycle of 10 msec. Integrated controller 10 includes a target drive force calculating section 100, a mode selecting section 200, a target charge-and-discharge calculating section 300, and an operating point command section 400.

Figure 3:
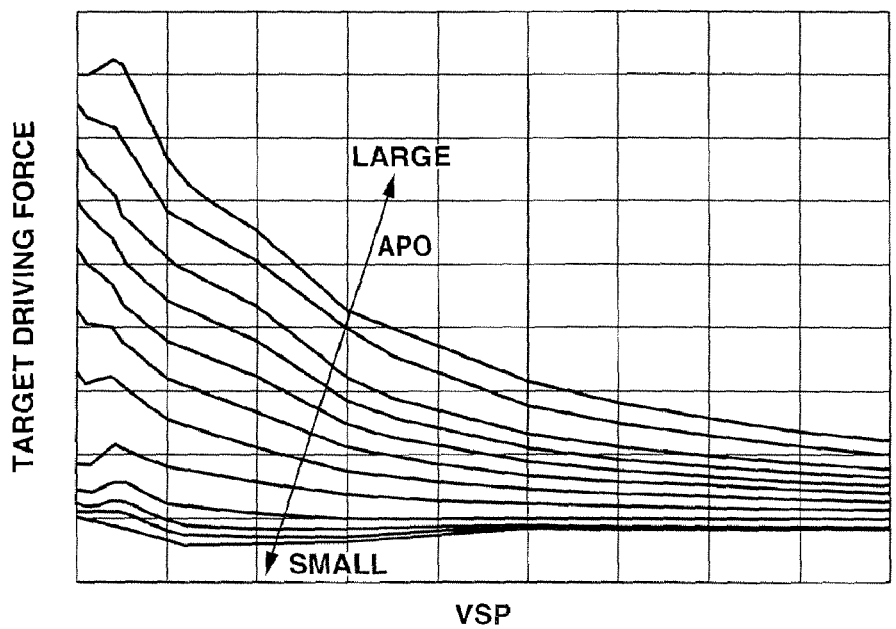
FIG. 3 is a view showing one example of a target driving force map used in a target driving force calculation in a target driving force calculating section of FIG. 2.

Target drive force calculating section 100 calculates a target driving force tFo0 from accelerator opening APO and vehicle speed VSP by using a target driving force map shown in FIG. 3.

Figure 5:
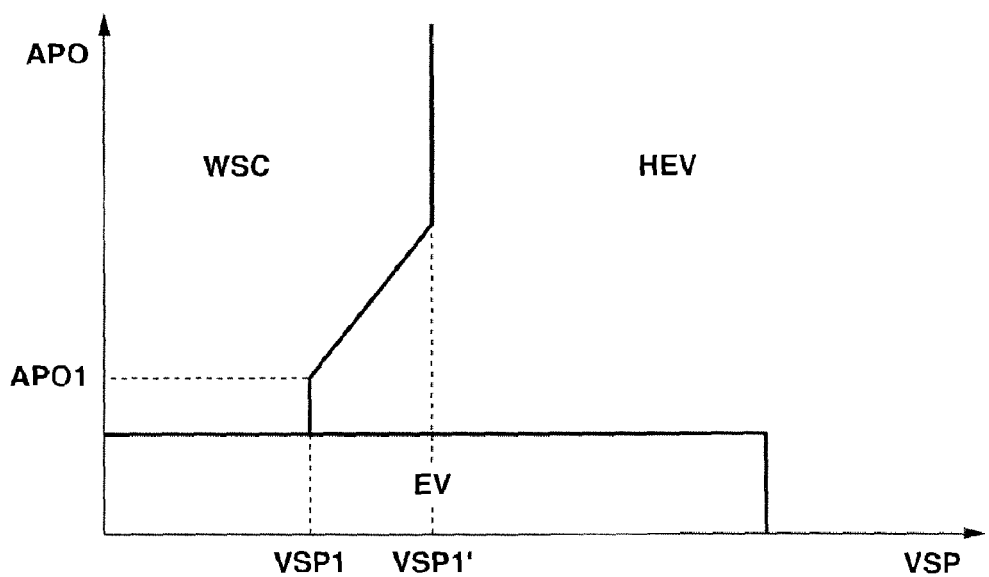
FIG. 5 is a view showing a mode map used for selecting a target mode in a mode selecting section in FIG. 2.

FIG. 5 is a view showing a mode map. Mode selecting section 200 selects a target mode based on the mode map. In the mode map, there are provided the EV running mode, the WSC running mode, and the HEV running mode. Mode selecting section 200 selects the target mode from accelerator opening APO and vehicle speed VSP. However, even when the EV running mode is selected, the target mode is forcibly set to the HEV running mode or the WSC running mode if the battery SOC is equal to or smaller than a predetermined quantity.

Figure 4:
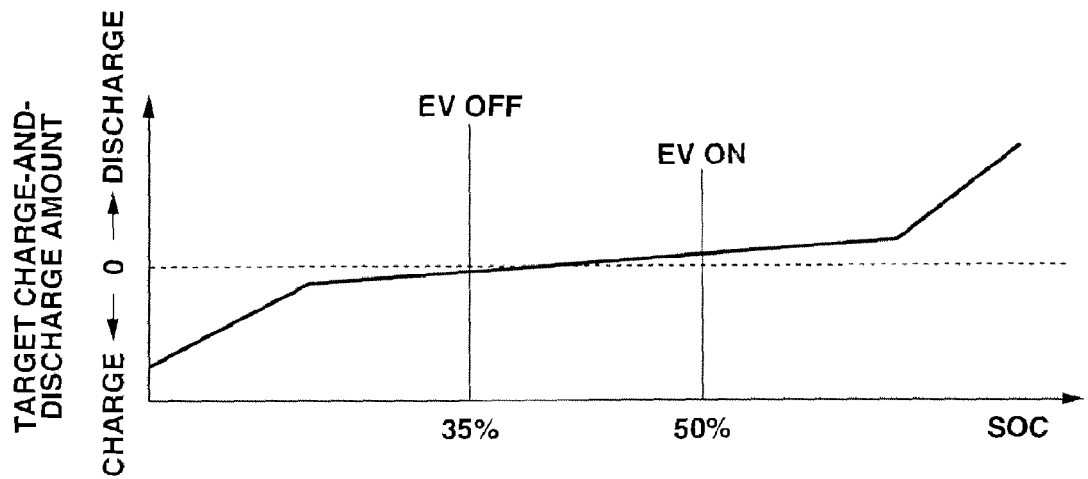
FIG. 4 is a view showing one example of a target charge-and-discharge amount map used in a calculation of a target charge amount and a target discharge amount in a target charge-and-discharge calculating section of FIG. 2.

Target charge-and-discharge calculating section 300 calculates a target charge-and-discharge electric power tP from the battery SOC by using a target charge-and-discharge amount map shown in FIG. 4. In the target charge-and-discharge amount map, an EVON line to permit the EV running mode is set to SOC=50%, and an EVOFF line to prohibit the EV running mode is set to SOC=35%.

When the battery SOC is equal to or greater than 50% (SOC≧50%), the EV running mode region appears in the mode map of FIG. 5. In a case in which the EV running mode region appears once in the mode map of FIG. 5, this EV running mode region continues to exist in the mode map until the battery SOC is smaller than 35%. When the battery SOC is smaller than 35% (SOC<35%), the EV running mode disappears from the mode map of FIG. 5. In a case in which the EV running mode region disappears from the mode map, this EV running mode region continues to disappear from the mode map until the battery SOC is equal to or greater than 50%.

Operating point command section 400 calculates, as a target operating point, a transient target engine torque, a target motor generator torque, a target second clutch engagement capacity, a target transmission capacity of the belt-type continuously-variable transmission (the line pressure, the secondary pulley hydraulic pressure and so on), and a first clutch solenoid current command which is a transmission torque capacity of first clutch CL1, from accelerator opening APO, target driving force tFo0, the target mode, vehicle speed VSP, and target charge-and-discharge electric power tP. Operating point command section 400 includes an engine start control section 401 configured to start engine E at the transition from the EV running mode to the HEV running mode. In the first embodiment, the target transmission capacity is set in accordance with the desired torque of the driver and so on.

Operating point command section 400 further includes a slip rate calculating section 402 configured to calculate an actual slip rate generated between the belt and the pulley (the primary pulley or the secondary pulley) of the belt-type continuously-variable transmission CVT; and a torque adjusting section (torque control section) 403 configured to adjust the engine torque or the motor generator torque in accordance with a deviation (difference) between a predetermined slip rate (about 2%) and the actual slip rate calculated in slip rate calculating section 402.

Slip rate calculating section 402 calculates the slip rate generated between the pulley and the belt from the actual transmission gear ratio based on the groove width (belt winding diameter which is a diameter of the belt wound around the pulley), and sensed (determined) from the pulley groove width, and the actual transmission gear ratio based on the rotational speed, and which is obtained from the ratio between the primary pulley rotational speed and the secondary pulley rotational speed. The slip rate may be a slip amount.

Torque adjusting section 403 is configured to adjust to decrease the input torque when the calculated slip rate is greater than a predetermined slip rate (when the slip is large), and to adjust to increase the input torque when the calculated slip rate is smaller than the predetermined slip rate (when the slip is small). Moreover, in the first embodiment, in the standpoint of the response to the control command, motor generator MG adjusts the torque (necessary for) of the high response of the desired torque adjusting amount which is a high frequency component. On the other hand, engine E adjusts the torque of (necessary for) the low response of the desired torque adjusting quantity which is a low frequency component. The high response corresponds to an initial rise portion or initial increase stage when the torque adjusting amount is inputted in a stepped manner. The low response corresponds to a portion which is steadily desired after the torque adjusting amount is inputted in the stepped manner. Engine E and motor generator MG may be selected in accordance with the deviation (difference) between the actual slip rate and the predetermined slip rate. Engine E and motor generator MG may be selected in accordance with the gradient and so on of variation of the deviation.

[Slip Control Operation] Next, the slip control operation which brings the belt-type continuously-variable transmission to the predetermined slip state is illustrated. In general, in the belt-type continuously-variable transmission, the slip between the pulley and the belt is prohibited. The hydraulic pressure is produced to generate a pulley pressing force which does not cause the slip (hereinafter, referred to as a cramp hydraulic pressure). In addition to the cramp hydraulic pressure, the hydraulic pressure for the shift (shift hydraulic pressure) is generated. The pressing force necessary for the pulley is determined by a product of the hydraulic pressure and the area. In the hydraulic system in which the line pressure is always supplied to the secondary pulley in the first embodiment, the effective pressure receiving area of the primary pulley is set different from the effective pressure receiving area of the secondary pulley (specifically, the effective pressure receiving area of the primary pulley is set to about double the effective pressure receiving area of the secondary pulley). With this, the slip on the secondary pulley's side is prevented, and the larger pressing force is acted to the primary pulley so as to perform the shift (to vary the transmission gear ratio).

However, it was understood (confirmed) that the frictional coefficient when the slip rate is about 2% is larger than the frictional coefficient when the slip rate is near (almost) zero by experiment of the frictional coefficient and the slip rate acted between the pulley and the belt. That is, it was understood (confirmed) that the torque transmitting efficiency when the control operation is performed to generate the slight slip between the pulley and the belt is larger than the torque transmitting efficiency when the control operation is performed to completely suppress the slip between the pulley and the belt.

In the general belt-type continuously-variable transmission, the clamp pressure is set to a hydraulic pressure higher than the hydraulic pressure at which the slip is not generated in view of the security (factor), as mentioned above. However, it is preferred that the slip is generated in a measure (to some extent), as mentioned above. Accordingly, the clamp pressure must not be set to a higher value. That is, in this embodiment, the hydraulic pressure is controlled to a hydraulic pressure to bring the desired slip state, and consequently it is possible to improve the frictional coefficient of the belt-type continuously-variable transmission by setting the line pressure to a value considerably smaller than the line pressure which was thought to be necessary for the belt-type continuously-variable transmission. The efficiency of the belt-type continuously-variable transmission is deteriorated by the load of the oil pump. Therefore, the decrease of the load of the oil pump is considerably attractive (preferred). At the same time, it is possible to increase the frictional coefficient between the pulley and the belt.

Accordingly, it is considered that it is possible to obtain the desired slip rate, to decrease the load of the oil pump, and to improve the frictional coefficient if the clamp pressure (transmission capacity) of the belt-type continuously-variable transmission is set in accordance with the slip rate. However, in a control configuration (hereinafter, referred to as a hydraulic pressure adjusting type) in which the clamp pressure is adjusted in accordance with the deviation (difference) between the actual slip rate and the desired slip rate, there is caused a problem described below.

FIG. 6 is a time chart when a hydraulic pressure adjusting type is employed. It may be considered that the transmission capacity in FIG. 6 is the hydraulic pressure on the capacity's side. For example, it may be considered that the transmission capacity is the line pressure or the secondary pressure. Moreover, the transmission capacity is set to increase as the torque inputted to the belt-type continuously-variable transmission increases.

Initial conditions are that the accelerator opening by the driver is constant, and that the desired belt slip is obtained. When the driver depresses the accelerator pedal, the engine torque and the motor torque increase. At the same time, the transmission capacity increases. That is, the secondary pulley hydraulic pressure increases. Consequently, the actual slip rate decreases below the desired slip rate. Accordingly, the controller outputs the command so as not to extremely increase the transmission capacity for increasing the actual slip rate. With this, the actual slip rate shifts from the decrease to the increase. The actual slip increases above the desired slip rate in an overshoot manner. Therefore, the transmission capacity is increased to decrease the overshooted actual slip rate.

In a case in which the secondary pulley hydraulic pressure is controlled in this way by the hydraulic control, the response delay from the control command to varying the capacity is large. Accordingly, it was difficult to stably produce the desired slip rate. It is attractive (preferred) that the frictional coefficient increases by obtaining the desired slip rate. However, when the excessive slip rate is generated, the contact surfaces between the pulley and the belt may be broken, and the belt may be broken.

Therefore, in the first embodiment, the slip rate control is not performed by the hydraulic pressure control. The slip rate control is performed by controlling the torque inputted to the belt-type continuously-variable transmission to obtain the desired slip state. FIG. 7 is a time chart showing a slip rate control operation in the first embodiment. When the driver depresses the accelerator pedal to increase the input torque, the slip rate increases. When the torque adjusting operation for the high response is required, the motor generator torque is adjusted to decrease. Motor generator MG has high response with respect to the control command, and accordingly the slip rate can be quickly converged to the desired slip rate. Similarly, when the torque adjusting operation for the low response is required, the engine torque is adjusted to decrease. With this, the slip rate can be stably converged to the desired slip rate.

(1) A belt continuously-variable transmission control apparatus according to the embodiments of the present invention includes: a belt continuously-variable transmission (CVT) including; a primary pulley (PP) arranged to receive a torque from a driving source (E,MG); a secondary pulley (SP) arranged to output the torque to driving wheels (FL,FR); a belt (VB) wound around the primary pulley (PP) and the secondary pulley (SP); a shift control section (7) configured to control a pressing force of the primary pulley (PP) and a pressing force of the secondary pulley (SP), and to obtain a desired transmission gear ratio; and a torque control section (403) configured to control the torque of the driving source (E,MG), and thereby to bring the belt (VB) and one of the primary pulley (PP) and the secondary pulley (SP) to a predetermined slip state. That is, the desired (predetermined) slip amount between the pulley and the belt are generated. Accordingly, it is possible to decrease the necessary hydraulic pressure. Moreover, it is possible to suppress the excessive belt slip by adjusting the input torque, without increasing the hydraulic pressure.

(2) In the belt continuously-variable transmission control apparatus according to the embodiments of the present invention, the driving source is an engine. Accordingly, it is possible to improve the responsiveness (response) relative to the hydraulic pressure control by adjusting the input torque by engine E, and to obtain the stable slip rate.

(3) In the belt continuously-variable transmission control apparatus according to the embodiments of the present invention, the driving source is a motor. Accordingly, it is possible to improve the is responsiveness (response) relative to the hydraulic pressure control by adjusting the input torque by motor generator (motor) MG, and to obtain the stable slip rate.

(4) When the torque adjusting operation for the high response is required, the torque is adjusted by motor generator MG. When the torque adjusting operation with the low response is required, the torque is adjusted by engine E. Consequently, it is possible to attain the further stable slip rate.

Second Embodiment

Next, a control apparatus for a belt-type continuously-variable transmission according to a second embodiment of the present invention is illustrated. The control apparatus according to the second embodiment is identical in a basic control configuration to the control apparatus according to the first embodiment. The following explanation is directed only to points different from the first embodiment, and repetitive explanation is omitted. FIG. 8 is a time chart showing a slip rate control operation in the second embodiment. In the first embodiment, engine E and motor generator MG are simultaneously used. In the second embodiment, the torque is adjusted only by engine E, unlike the first embodiment. Accordingly, it is possible to attain the effects shown in (1) and (2) of the first embodiment. Moreover, it is possible to simplify the control logic by adjusting the input torque only engine E.

Third Embodiment

Next, a control apparatus for a belt-type continuously-variable transmission according to a third embodiment of the present invention is illustrated. The control apparatus according to the third embodiment is identical in a basic control configuration to the control apparatus according to the first embodiment. The following explanation is directed only to points different from the first embodiment, and repetitive explanation is omitted. FIG. 9 is a time chart showing a slip rate control operation in the third embodiment. In the first embodiment, engine E and motor generator MG are simultaneously used. In the third embodiment, the torque is adjusted only by motor generator MG, unlike the first embodiment. Accordingly, it is possible to attain the effects shown in (1) and (3) of the first embodiment. Moreover, it is possible to simplify the control logic by adjusting the input torque only by motor generator MG. Furthermore, motor generator MG has a response higher than that of engine E. Accordingly, it is possible to quickly converge the slip rate.

Fourth Embodiment

Next, a control apparatus for a belt-type continuously-variable transmission according to a fourth embodiment of the present invention is illustrated. The control apparatus according to the fourth embodiment is identical in a basic control configuration to the control apparatus according to the first embodiment. The following explanation is directed only to points different from the first embodiment, and repetitive explanation is omitted. In the first embodiment, slip rate calculating section 402 and torque adjusting section 403 adjust the engine torque and/or the motor generator torque, and thereby control the slip rate. The control apparatus according to the fourth embodiment includes an engine speed control section 404 configured to control the engine speed as the target value, and thereby to control the slip rate, in place of slip rate calculating section 402 and torque adjusting section 403 of the first embodiment.

Figure 10:
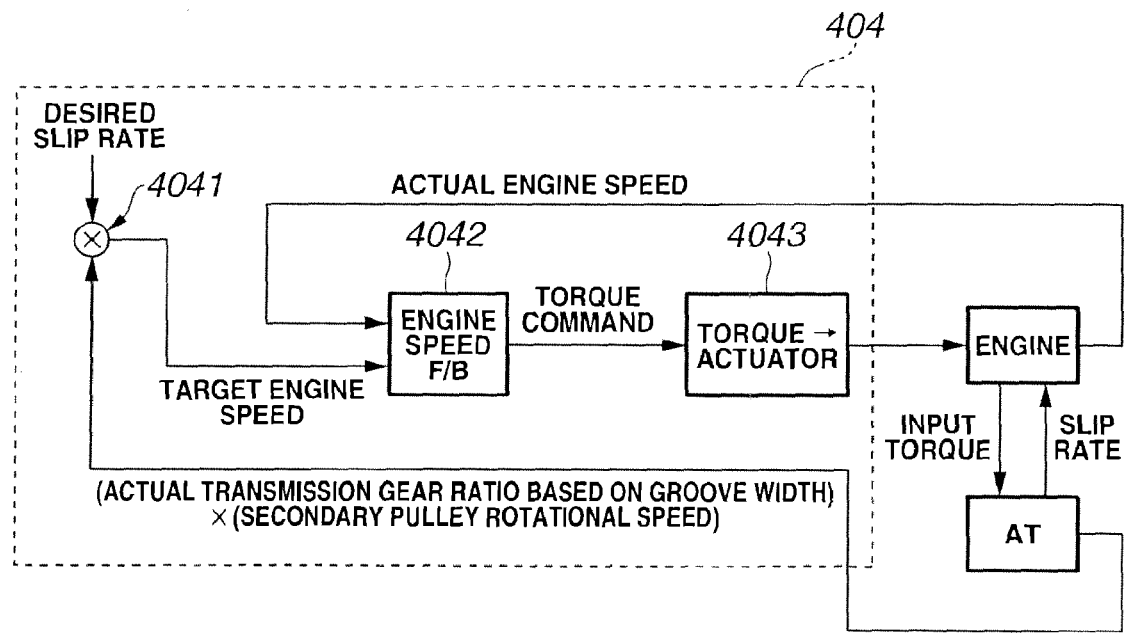
FIG. 10 is a block diagram showing a control configuration of an engine speed control section in a fourth embodiment of the present invention.

FIG. 10 is a block diagram showing a control configuration of engine speed control section 404 in the fourth embodiment. Engine speed control section 404 includes a target engine speed calculating section 4041, an engine speed feedback control section 4042, and a torque-actuator signal conversion section 4043. Target engine speed calculating section 4041 calculates the target engine speed by multiplying the desired slip rate (1.02 in case of obtaining the slip rate of 2%) and the product of the secondary pulley actual rotational speed and the actual transmission gear ratio calculated based on the groove width (which represents the belt winding diameter which is a diameter of the belt wound around the pulley). In this case, the product of the secondary pulley actual rotational speed and the actual transmission gear ratio calculated based on the groove width is the primary pulley rotational speed (the engine speed) when the slip is not utterly generated. By multiplying the desired slip rate (1.02 corresponding to 2%) and the product of the secondary pulley actual rotational speed and the actual transmission gear ratio calculated based on the groove width, it is possible to obtain the desired slip state between the pulley and the belt.

Engine speed feedback control section 4042 calculates the engine torque by PI control based on the deviation (difference) between the calculated target engine speed and the sensed actual engine speed. That is, engine speed feedback control section 4042 outputs a command to increase the engine torque when the engine speed does not reach (is smaller than) the target engine speed. Engine speed feedback control section 4042 outputs a command to decrease the engine torque when the engine speed exceeds (is greater than) the target engine speed. That is, the engine torque is controlled to attain the target engine speed. The engine torque is not directly controlled object. The engine torque is indirectly controlled.

Torque-actuator signal conversion section 4043 converts to an actuator signal to attain the command engine torque, and outputs to engine controller 1. In case of controlling the torque by varying the ignition timing, torque-actuator signal conversion section 4043 converts to an ignition-timing control actuator command. In case of controlling the torque by varying the throttle opening, torque actuator signal conversion section 4043 converts to a throttle actuator command.

Figure 11:
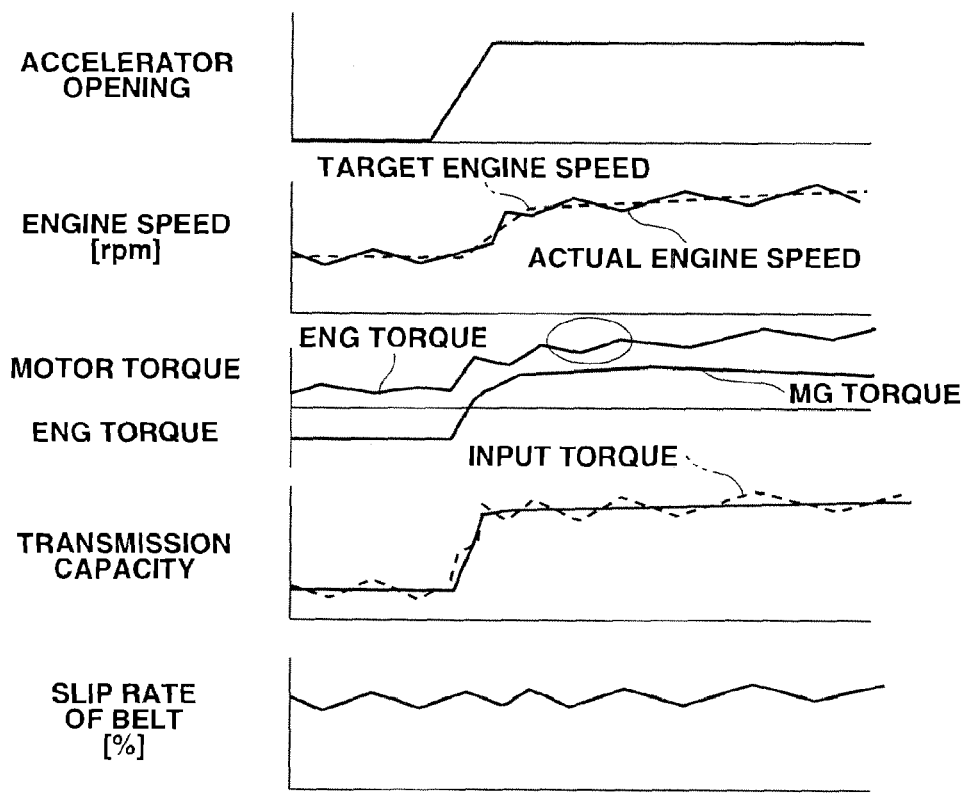
FIG. 11 is a time chart showing a slip rate control operation in the fourth embodiment of the present invention.

FIG. 11 is a time chart showing a slip rate control operation in the fourth embodiment. In a steady running state in which the accelerator opening is constant, target engine speed calculating section 4041 calculates the target engine speed to obtain the desired (predetermined) slip rate. The engine torque is controlled so as to attain the target engine speed. The motor generator torque is set in accordance with a desired driving force calculated based on the accelerator opening and so on. When the accelerator pedal is depressed, the motor generator torque increases. The secondary pulley rotational speed increases by the acceleration, and consequently the target engine speed increases. The engine torque is appropriately controlled in accordance with the increase of the target engine speed. Therefore, it is possible to attain the effects shown in (1) and (2), and effects described below.

(5) The engine torque is controlled so that the engine speed of engine E (power source) becomes the engine speed corresponding to the predetermined slip rate (the slip state). Accordingly, it is possible to improve the control accuracy by determining the controlled variable based on the engine speed since the slip rate is a value based on the engine speed.

Fifth Embodiment

Next, a control apparatus for a belt-type continuously-variable transmission according to a fifth embodiment of the present invention is illustrated. The control apparatus according to the fifth embodiment is identical in a basic control configuration to the control apparatus according to the fourth embodiment. The following explanation is directed only to points different from the fourth embodiment, and repetitive explanation is omitted. In the fourth embodiment, the engine speed is the controlled object. In the fifth embodiment, the motor generator rotational speed is the controlled object, unlike the fourth embodiment. In the fourth embodiment, first clutch CL1 is always (constantly) engaged, and engine E and motor generator MG are simultaneously used (in the HEV running mode). In the fifth embodiment, first clutch CL1 may be disengaged, and the slip rate control operation may be performed in the EV running mode in which the only motor generator MG is used.

Figure 12:
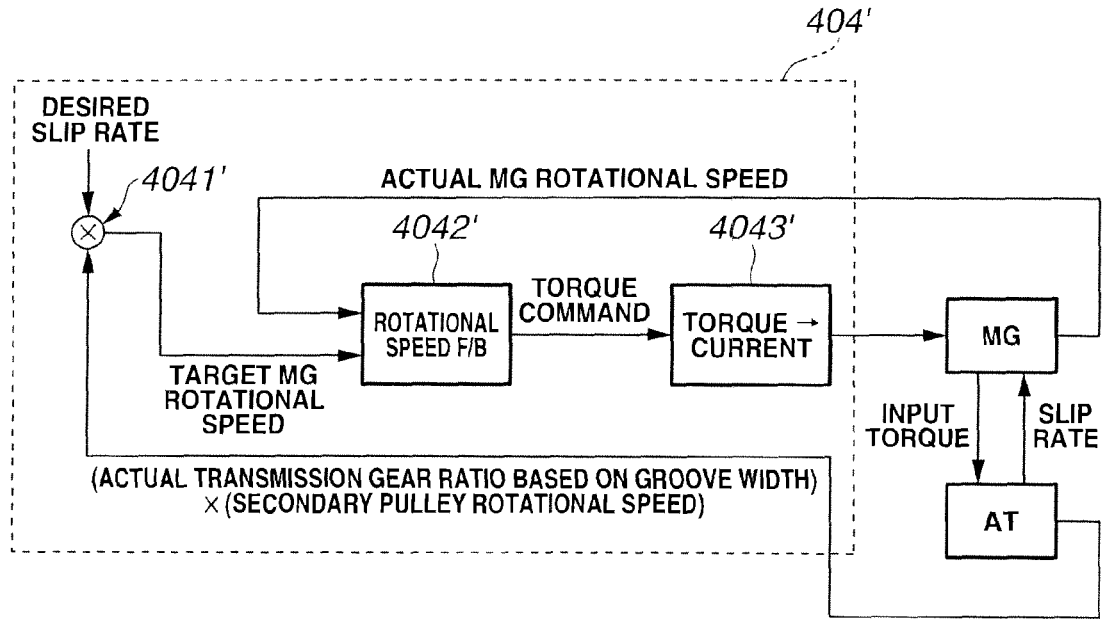
FIG. 12 is a block diagram showing a control configuration of a motor generator rotational speed control section in a fifth embodiment of the present invention.

FIG. 12 is a block diagram showing a control configuration of a motor generator rotational speed control section 404' in the fifth embodiment. Motor generator rotational speed control section 404' includes a target motor generator rotational speed calculating section 4041', a rotational speed feedback control section 4042', and a torque-actuator signal conversion section 4043'. The control operation of the motor torque in the fifth embodiment is identical to the control operation of the engine torque in the fourth embodiment, and repetitive illustration is omitted. Torque-actuator signal conversion section 4043' controls the torque by controlling the amount and the energization timing of the current which flows in motor generator MG.

Figure 13:
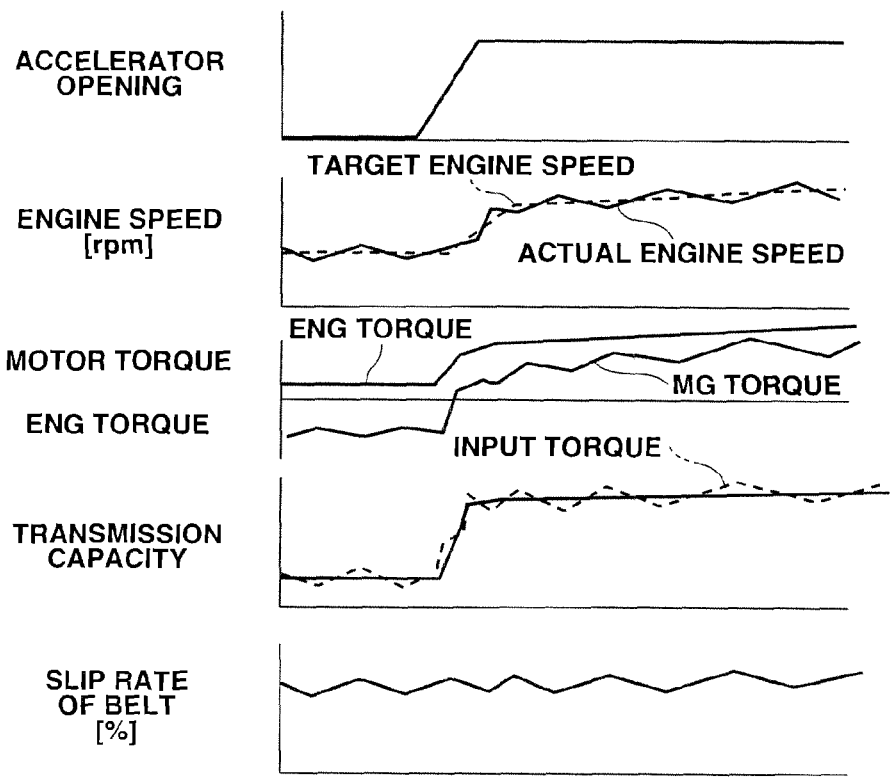
FIG. 13 is a time chart showing a slip rate control operation in the fifth embodiment.

FIG. 13 is a time chart showing a slip rate control operation of the fifth embodiment. In the steady running state in which the accelerator opening is constant, target motor generator rotational speed calculating section 4041' calculates the target motor generator rotational speed to obtain a predetermined slip rate. The motor generator torque is controlled so as to attain the target motor generator rotational speed. The engine torque is set in accordance with the desired driving force calculated based on the accelerator opening and so on. When the accelerator pedal is depressed, the engine torque increases. The secondary pulley rotational speed increases by the acceleration, and consequently the target motor generator rotational speed increases. The motor generator torque is appropriately controlled in accordance with the increase of the target motor generator rotational speed. Accordingly, it is possible to obtain the effects (1) and (3) of the first embodiment, and to further obtain effects described below.

(6) The motor generator torque is controlled so that the rotational speed of motor generator (power source) MG becomes the rotational speed corresponding to the predetermined slip rate (the slip state). Accordingly, it is possible to improve the control accuracy by determining the controlled variable based on the rotational speed since the slip rate is a value based on the rotational speed. Moreover, it is possible to attain the stable slip rate control in the HEV running mode and also in the EV running mode, by controlling by motor generator MG.

Sixth Embodiment

Next, a control apparatus for a belt-type continuously-variable transmission is illustrated. The control apparatus according to the sixth embodiment is identical in a basic control configuration to the control apparatus according to the fourth embodiment. The following explanation is directed only to points different from the fourth embodiment, and repetitive explanation is omitted. In the fourth embodiment, engine speed control section 404 controls the engine speed as the target value so as to control the slip rate. In the sixth embodiment, the control apparatus includes, in addition to engine speed control section 404, a transmission capacity control section 405 configured to set the transmission capacity of belt-type continuously-variable transmission CVT based on a deviation (difference) between the desired torque of the engine which is calculated based on the desired driving force, and the torque command (command torque) corresponding to the actual engine torque, unlike the fourth embodiment.

Figure 14:
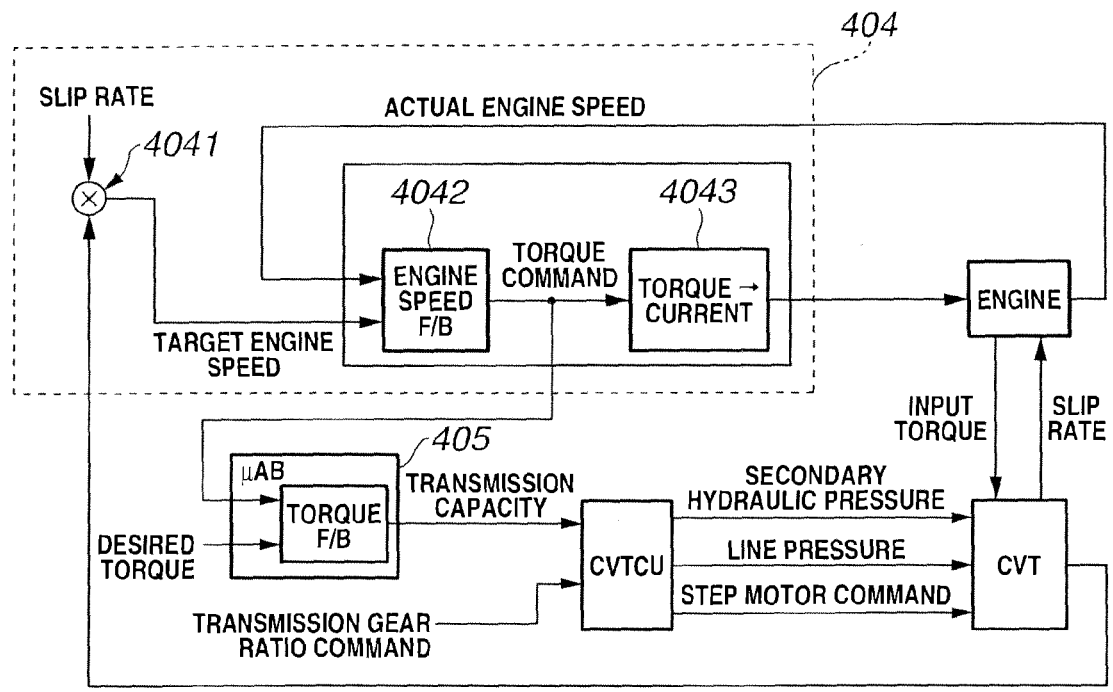
FIG. 14 is a block diagram showing a control configuration of an engine speed control section and a transmission capacity control section in a sixth embodiment of the present invention.

FIG. 14 is a block diagram showing a control configuration of engine speed control section 404 and transmission capacity control section 405. Engine speed control section 404 is identical to that of the fourth embodiment, and repetitive explanation is omitted. Transmission capacity control section 405 receives the torque command which is the engine torque outputted from engine speed feedback control section 4042, and the desired torque of the engine which is calculated based on the desired driving force. Transmission capacity control section 405 calculates the transmission capacity by the PI control based on the deviation (difference) between the torque command and the desired torque.

In case of controlling the slip rate between the pulley and the belt, the stable slip rate can be obtained by controlling the engine speed. However, when the slip rate is extremely large, the command to decrease the engine torque is outputted so as to decrease the engine speed. That is, the actual torque becomes smaller than the driving force (desired torque) desired by the driver and so on in accordance with the reduction of the torque, so that the driver feels the uncomfortable feeling.

In the sixth embodiment, the transmission capacity is outputted in accordance with the deviation (difference) between the desired torque and the actual torque, to belt-type continuously-variable transmission CVT. For example, when the torque command is smaller than the desired torque, the high transmission capacity is outputted. Consequently, the pulley pressing force increases, and it is difficult to generate the slip between the belt and the pulley. In engine E, it is necessary to increase the engine speed since the slip is not obtained. Consequently, the engine torque is increased. That is, when the transmission capacity is increased, the torque of engine E whose the engine speed is controlled is controlled to increase. Therefore, it is possible to attain the desired torque, and to also obtain the stable slip rate.

Figure 15:
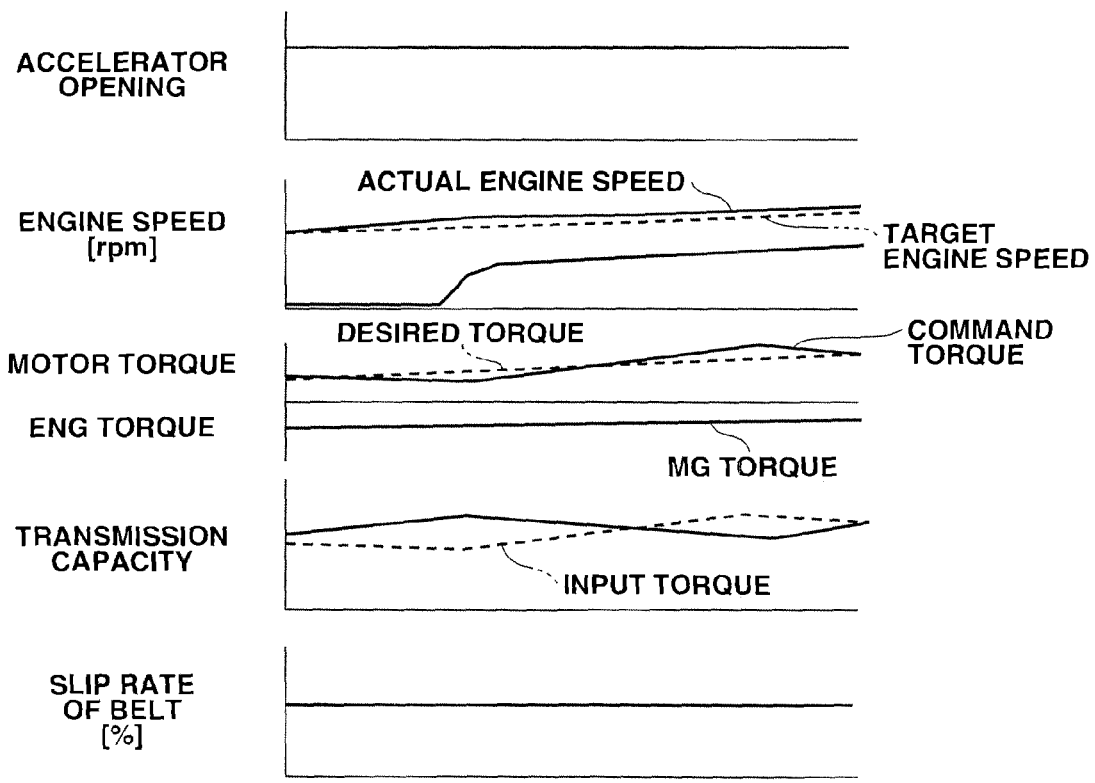
FIG. 15 is a time chart showing a slip rate control operation in the sixth embodiment of the present invention.

FIG. 15 is a time chart showing the slip rate control operation of the sixth embodiment. In a steady running state in which the accelerator opening is constant, target engine speed calculating section 4041 calculates the target engine speed to obtain the predetermined slip rate. The engine torque is controlled so as to attain this target engine speed. The motor generator torque is set in accordance with the desired driving force calculated based on the accelerator opening and so on. Accordingly, the motor generator torque is substantially constant. When the deviation (difference) between the desired torque and the torque command based on the engine speed control is generated, the transmission capacity is varied in accordance with the deviation.

Specifically, when the control of the sixth embodiment is not performed, the transmission capacity is varied in accordance with the sum of the actual engine torque and the actual motor generator torque. On the other hand, the torque capacity is set in the following manner when the transmission capacity control of the sixth embodiment is performed. In a case in which the command torque is smaller than the desired torque, the transmission capacity is set larger than the transmission capacity when the transmission capacity control of the sixth embodiment is not performed. Consequently, the command torque is quickly converged to the desired torque. On the other hand, in a case in which the command torque is larger than the desired torque, the transmission capacity is set smaller than the transmission capacity when the transmission capacity control of the sixth embodiment is not performed. Consequently, the command torque is quickly converged to the desired torque. Accordingly, it is possible to control the slip rate of the belt to more stable state to satisfy the desired torque. Therefore, it is possible to obtain the effects (1) and (2) of the first embodiment, the effect (5) of the fourth embodiment, and to further obtain effects described below.

(7) The transmission capacity (the hydraulic pressure of one of the two pulleys which is the capacity's side) is set in accordance with the deviation between the desired torque and the command torque (actual torque). With this, it is possible to attain the desired torque desired by the driver and so on, and to obtain the stable slip state.

Seventh Embodiment

Next, a control apparatus for a belt-type continuously-variable transmission according to a seventh embodiment of the present invention is illustrated. The control apparatus according to the seventh embodiment is identical in a basic control configuration to the control apparatus according to the fifth embodiment. The following explanation is directed only to points different from the fifth embodiment, and repetitive explanation is omitted. In the fifth embodiment, motor generator rotational speed control section 404' controls the motor generator rotational speed as the target value so as to control the slip rate. In the seventh embodiment, the control apparatus includes, in addition to motor generator rotational speed control section 404', a transmission capacity control section 405' configured to set the transmission capacity of belt-type continuously-variable transmission CVT based on the deviation (difference) between the desired torque of motor generator MG which is calculated based on the desired driving force, and the command torque corresponding to the actual motor generator torque, unlike the fifth embodiment.

Figure 16:
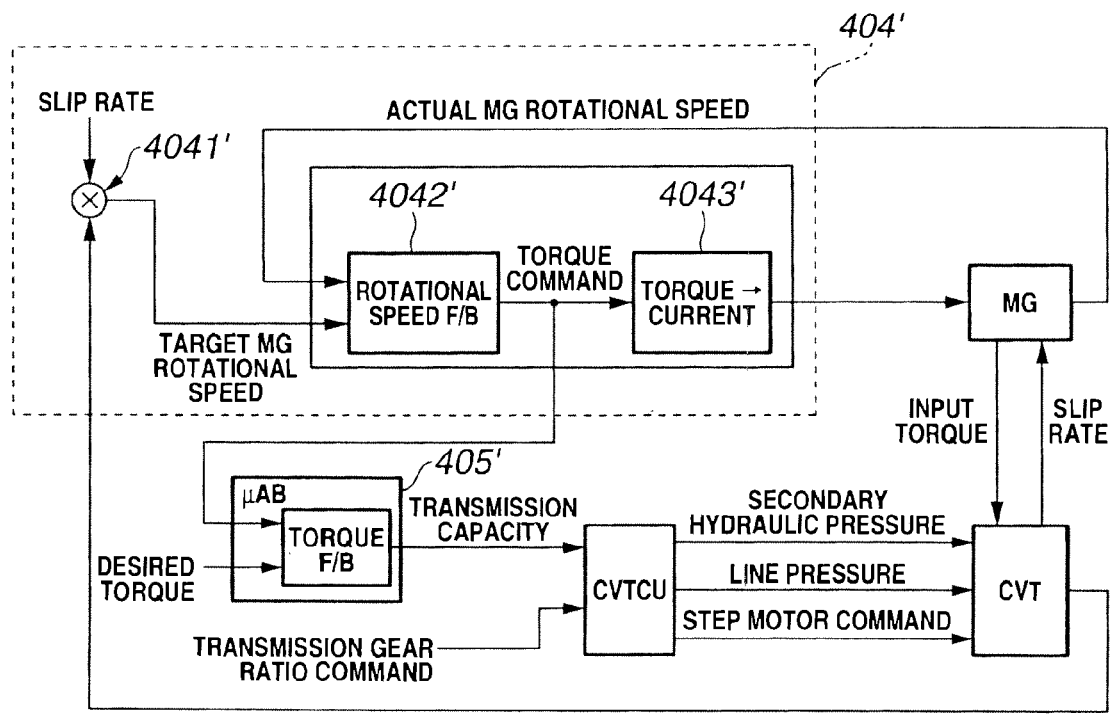
FIG. 16 is a block diagram showing a motor rotational speed control section and a transmission capacity control section in a seventh embodiment of the present invention.

FIG. 16 is a block diagram showing a control configuration of motor generator rotational speed control section 404' and transmission capacity control section 405'. Motor generator rotational speed control section 404' is identical to that of the fifth embodiment, and repetitive explanation is omitted. Transmission capacity control section 405' receives the torque command which is the motor generator torque outputted from rotational speed feedback control section 4042', and the desired torque of motor generator MG which is calculated based on the desired driving force. Transmission capacity control section 405' calculates the transmission capacity by the PI control based on the deviation (difference) between the torque command and the desired torque. The operation of the transmission capacity is identical to that of the sixth embodiment, and repetitive explanation is omitted.

Figure 17:
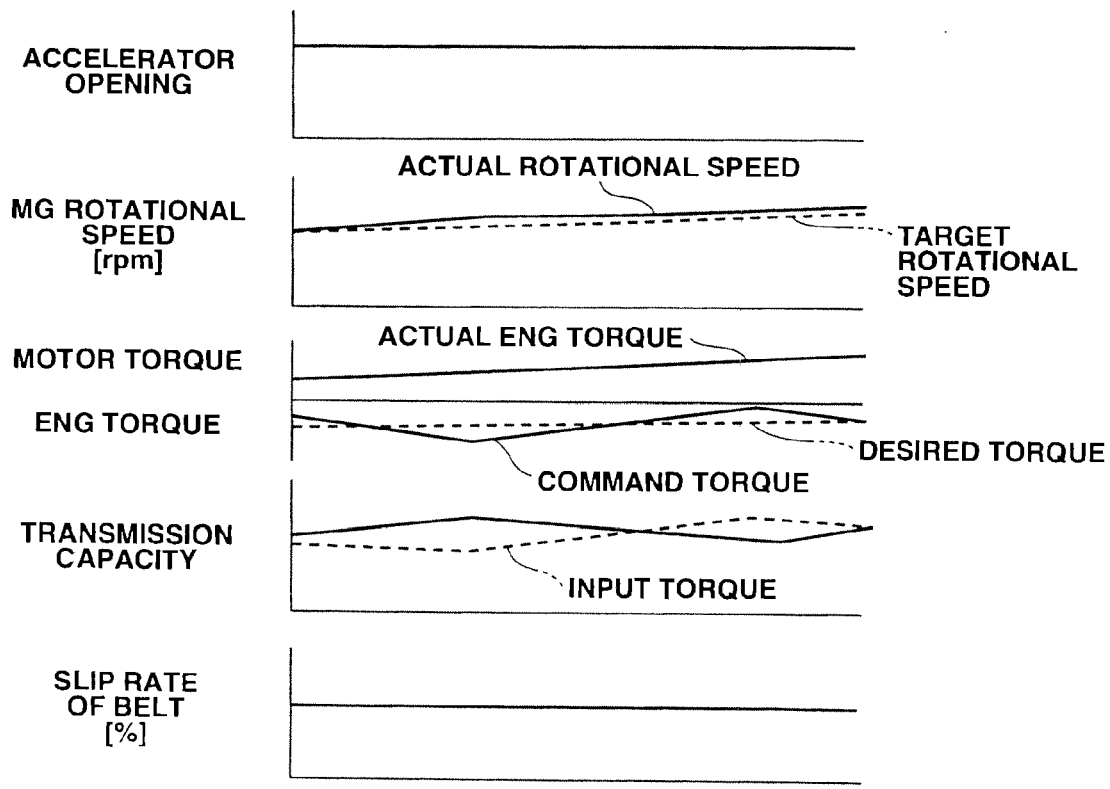
FIG. 17 is a time chart showing a slip rate control operation in the seventh embodiment.

FIG. 17 is a time chart showing a slip rate control operation of the seventh embodiment. In a steady running state in which the accelerator opening is constant, target motor generator rotational speed calculating section 4041' calculates the target motor generator rotational speed to obtain the predetermined slip rate. The motor generator torque is controlled to attain this target motor generator rotational speed. The engine torque is set in accordance with the desired driving force calculated based on the accelerator opening and so on. Accordingly, the engine torque is substantially constant. When the deviation (difference) between the desired torque and the torque command based on the motor generator rotational speed control is generated, the transmission capacity is varied in accordance with the deviation.

Specifically, when the control operation of the seventh embodiment is not performed, the transmission capacity is varied in accordance with the sum of the actual engine torque and the actual motor generator torque. On the other hand, the torque capacity is set in the following manner when the transmission capacity control of the seventh embodiment is performed. In a case in which the command torque is smaller than the desired torque, the transmission capacity is set larger than the transmission capacity when the transmission capacity control of the seventh embodiment is not performed. Consequently, the command torque is quickly converged to the desired torque. On the other hand, in a case in which the command torque is larger than the desired torque, the transmission capacity is set smaller than the transmission capacity when the transmission capacity control of the seventh embodiment is not performed. Consequently, the command torque is quickly converged to the desired torque. Accordingly, it is possible to control the slip rate of the belt to more stable state to satisfy the desired torque. Therefore, it is possible to obtain the effects (1) and (2) of the first embodiment, the effect (6) of the fifth embodiment, and the effect (7) of the sixth embodiment.

A belt continuously-variable transmission control apparatus according to the embodiments of the present invention includes: a belt continuously-variable transmission (CVT) including; a primary pulley (PP) arranged to receive a torque from a driving source (E,MG); a secondary pulley (SP) arranged to output the torque to driving wheels (FL,FR); a belt (VB) wound around the primary pulley (PP) and the secondary pulley (SP); a target rotational speed calculating section (4041,4041') configured to calculate a target rotational speed of the driving source (E,MG) to bring the belt (VB) and one of the primary pulley (PP) and the secondary pulley (SP) to a predetermined slip state; a rotational speed control section (404,404') configured to control a rotational speed of the driving source (E,MG) to the target rotational speed; a capacity side pulley pressure setting section (405, 405') configured to set a hydraulic pressure of one of the primary pulley (PP) and the secondary pulley (SP) which is a capacity side, in accordance with a deviation between a desired torque and an actual torque of the driving source (E,MG); and a shift control section (7) configured to control a pressing force of the primary pulley (PP) and a pressing force of the secondary pulley (SP) based on the hydraulic pressure of the one of the primary pulley and the secondary pulley of the capacity side, and thereby to obtain a desired transmission gear ratio.

Eighth Embodiment

Next, a control apparatus for a belt-type continuously-variable transmission according to an eighth embodiment of the present invention is illustrated. The control apparatus according to the eighth embodiment is identical in a basic control configuration to the control apparatus according to the sixth embodiment. The following explanation is directed only to points different from the sixth embodiment, and repetitive explanation is omitted. In the sixth embodiment, the transmission capacity is determined in accordance with the deviation (difference) between the desired torque and the command torque (torque command). In the eighth embodiment, in addition to the above-described control operation, the hydraulic pressure of the energy (inertia) used for the increase of the engine speed is not reflected to the transmission capacity while the engine speed increases.

Figure 18:
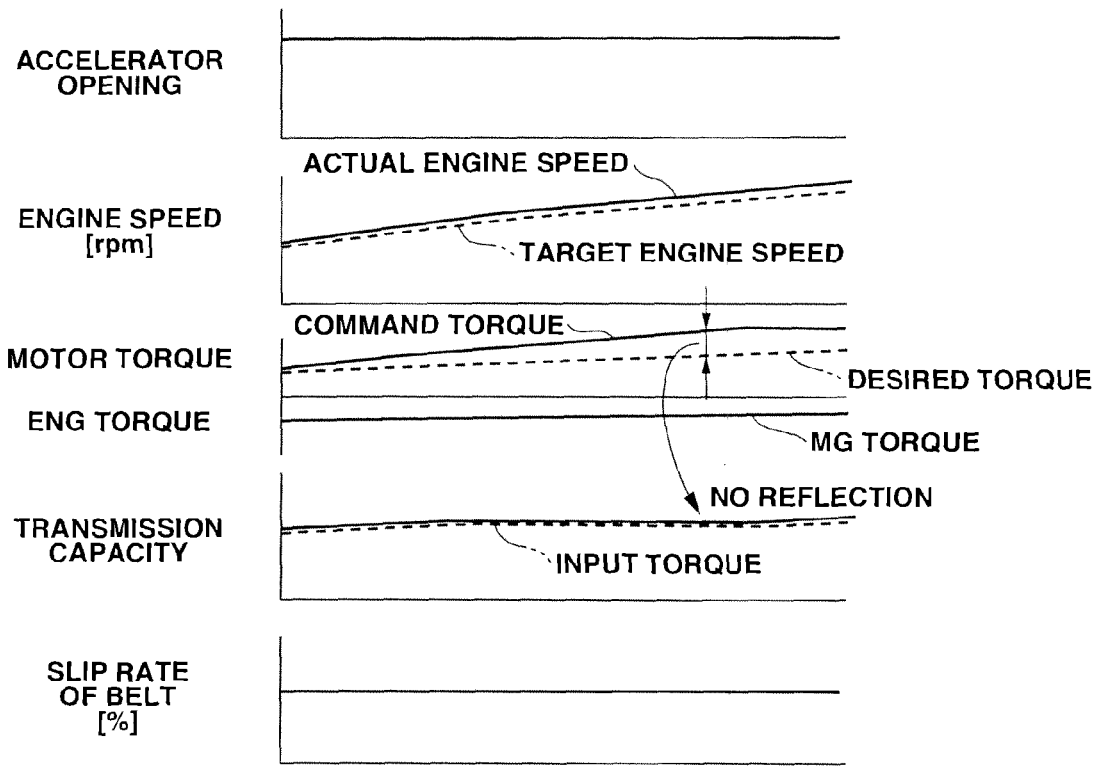
FIG. 18 is a time chart showing a slip rate control operation in an eighth embodiment of the present invention.

FIG. 18 is a time chart showing a slip rate control operation of the eighth embodiment. While the engine speed increases, the torque used for the increase of the engine speed is not outputted to belt-type continuously-variable transmission CVT, and used for the increase of the engine speed. The deviation (difference) between the desired torque and the command torque (actual torque) which is used for the increase of the engine speed is not reflected to the transmission capacity. With this, it is possible to obtain the stable slip rate. Therefore, it is possible to obtain the effects (1) and (2) of the first embodiment, the effect (5) of the fourth embodiment, the effect (7) of the sixth embodiment, and to further obtain effects described below.

(8) The control operation is performed by using the torque obtained by subtracting the inertia of engine E from the command torque (actual torque). Accordingly, it is possible to set the transmission capacity based on the torque actually inputted to belt-type continuously-variable transmission CVT, and to obtain the stable slip rate. Similarly, in case of the rotational speed control of motor generator MG, it is also possible to attain the same effects as the control operation of engine E by subtracting the inertia. In this case, it is also possible to obtain the effect (6) of the fifth embodiment.

Ninth Embodiment

Next, a control apparatus for a belt-type continuously-variable transmission CVT according to a ninth embodiment of the present invention is illustrated. The control apparatus according to the ninth embodiment is identical in a basic control configuration to the control apparatus according to the sixth embodiment. The following explanation is directed only to points different from the sixth embodiment, and repetitive explanation is omitted. In the sixth embodiment, the transmission capacity is determined in accordance with the deviation between the desired torque and the command torque (torque command). In the ninth embodiment, in addition to the above-described control configuration, the hydraulic pressure of the energy (inertia) used for the decrease of the engine speed is not reflected to the transmission capacity while the engine speed decreases.

Figure 19:
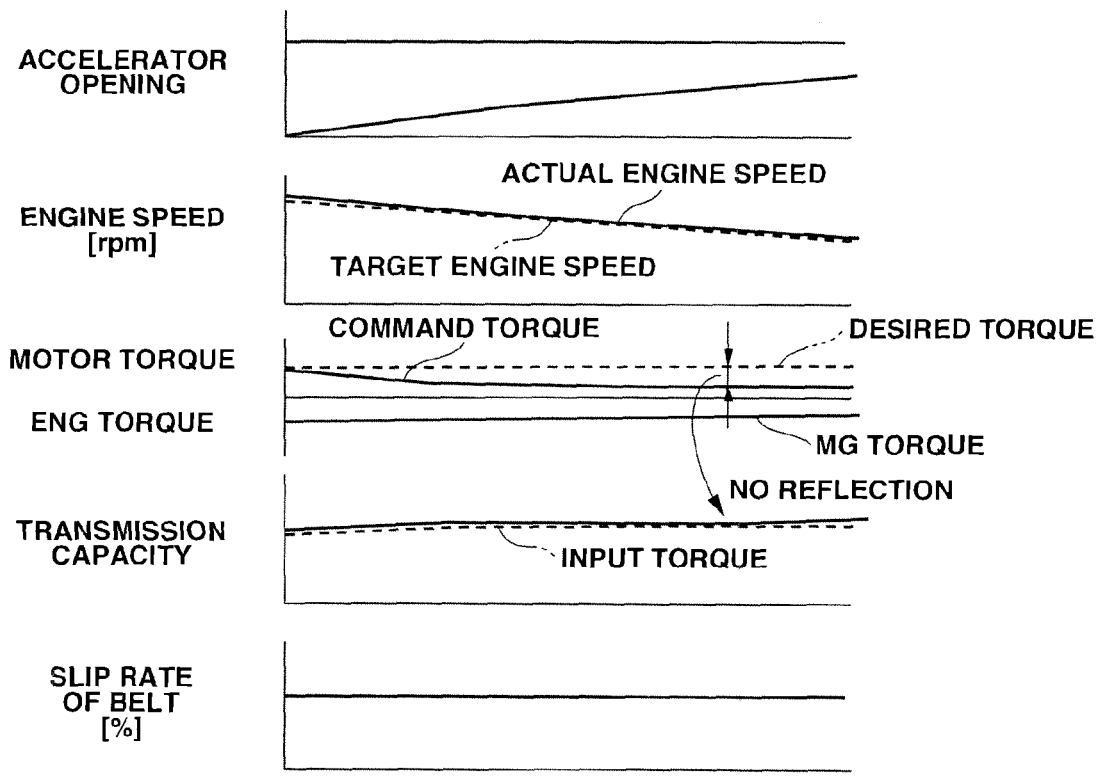
FIG. 19 is a time chart showing a slip rate control operation in a ninth embodiment of the present invention.

FIG. 19 is a time chart showing a slip rate control operation of the ninth embodiment. While the engine speed decreases, the torque used for the decrease of the engine speed is not outputted to belt-type continuously-variable transmission CVT, and used for the decrease of the engine speed. The deviation (difference) between the desired torque and the command torque (actual torque) used for the decrease of the engine speed is not reflected to the transmission capacity. Accordingly, it is possible to obtain the stable slip rate. Therefore, it is possible to obtain the effects (1) and (2) of the first embodiment, the effect (5) of the fourth embodiment, the effect (7) of the sixth embodiment, and the effect (8) of the eighth embodiment. Similarly, in case of the rotational speed control of motor generator MG, it is also possible to obtain the same effects as the control operation of engine E by subtracting the inertia. In this case, it is possible to obtain the effect (6) of the fifth embodiment.

Tenth Embodiment

Next, a control apparatus for a belt-type continuously-variable transmission according to a tenth embodiment of the present invention is illustrated. The control apparatus according to the tenth embodiment is identical in a basic control configuration to the control apparatus according to the fourth embodiment. The following explanation is directed to points to different from the fourth embodiment, and repetitive explanation is omitted. In the fourth embodiment, the engine torque is controlled to attain the target engine speed. In the tenth embodiment, in addition to the above-described control configuration, an upper limit value of the engine torque is set, unlike the fourth embodiment. In a case in which the engine speed is controlled, the torque for attaining the engine speed is set independently of the desired torque desired by the driver and so on. Accordingly, when the deviation between the target engine speed and the actual engine speed is large, the large torque command is outputted. In a case in which the upper limit value of the engine torque is not set, the torque larger than the desired torque of the driver and so on is outputted, so that the driver feels the uncomfortable feeling. This upper limit value of the engine torque is in accordance with the desired torque of the driver and so on. Specifically, this upper limit value of the engine torque is set so that the sum of the torque of motor generator MG and the engine torque does not exceed the sum of the desired torque and a predetermined allowable error.

Figure 20:
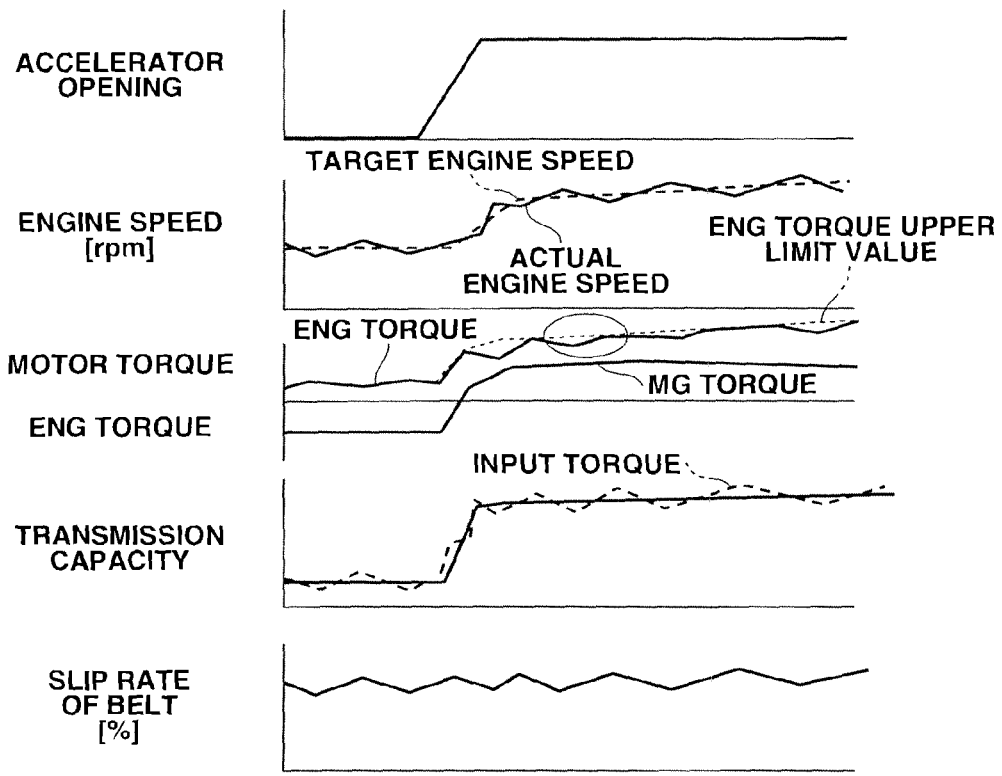
FIG. 20 is a time chart showing a slip rate control operation in a tenth embodiment of the present invention.

FIG. 20 is a time chart showing a slip rate control operation of the tenth embodiment. The engine torque is controlled so as to attain the target engine speed. In this case, the torque is not outputted beyond the engine torque upper limit value. Accordingly, it is possible to improve the operability (possibility) of the desired torque of the driver and so on even when the engine torque is not directly the controlled object. When the hydraulic pressure becomes the realizable lower limit during the acceleration (when the hydraulic pressure does not decrease any more) and the slip rate does not become (reach) a slip rate in which the frictional coefficient between the belt and the pulley becomes optimum, engine E excessively increases the torque to ensure the slip rate. On the other hand, in the tenth embodiment, the upper limit value is set. Accordingly, even when the desired slip rate is not obtained, it is possible to suppress the engine torque within the predetermined allowable error from the desired torque. Therefore, it is possible to attain the effects (1) and (2) of the first embodiment and the effect (5) of the fourth embodiment, and to further obtain effects described below.

(9) The upper limit value of the torque of engine (the driving source) E is set in accordance with the desired torque. Accordingly, it is possible to suppress the deviation from the desired torque even when the engine torque is controlled, and to improve the operability (possibility) of the desired torque. Moreover, it is possible to combine the sixth embodiment and the tenth embodiment. In this case, it is also possible to obtain the effect (7) of the sixth embodiment.

Eleventh Embodiment

Next, a control apparatus for a belt-type continuously-variable transmission according to an eleventh embodiment of the present invention is illustrated. The control apparatus according to the eleventh embodiment is identical in a basic control configuration to the control apparatus according to the fifth embodiment. The following explanation is directed only to points different from the fifth embodiment, and repetitive explanation is omitted. In the fifth embodiment, the motor generator torque is controlled so as to attain the target motor generator rotational speed. In the eleventh embodiment, in addition to the above-described control configuration, an upper limit value of the motor generator torque is set, unlike the fifth embodiment. In a case in which the rotational speed of motor generator MG is controlled, the torque for attaining the rotational speed is set independently of the desired torque desired by the driver and so on. Accordingly, when the deviation (difference) between the target motor generator rotational speed and the actual motor generator rotational speed is large, the large torque command is outputted. In a case in which the upper limit value is not set, the torque larger than the desired torque of the driver and so on is outputted, so that the driver feels the uncomfortable feeling. This upper limit value of the motor generator torque is set in accordance with the desired torque of the driver and so on. Specifically, the motor generator torque upper limit value is set so that the sum of the torque of motor generator MG and the engine torque does not exceed the sum of the desired torque and a predetermined allowable error.

Figure 21:
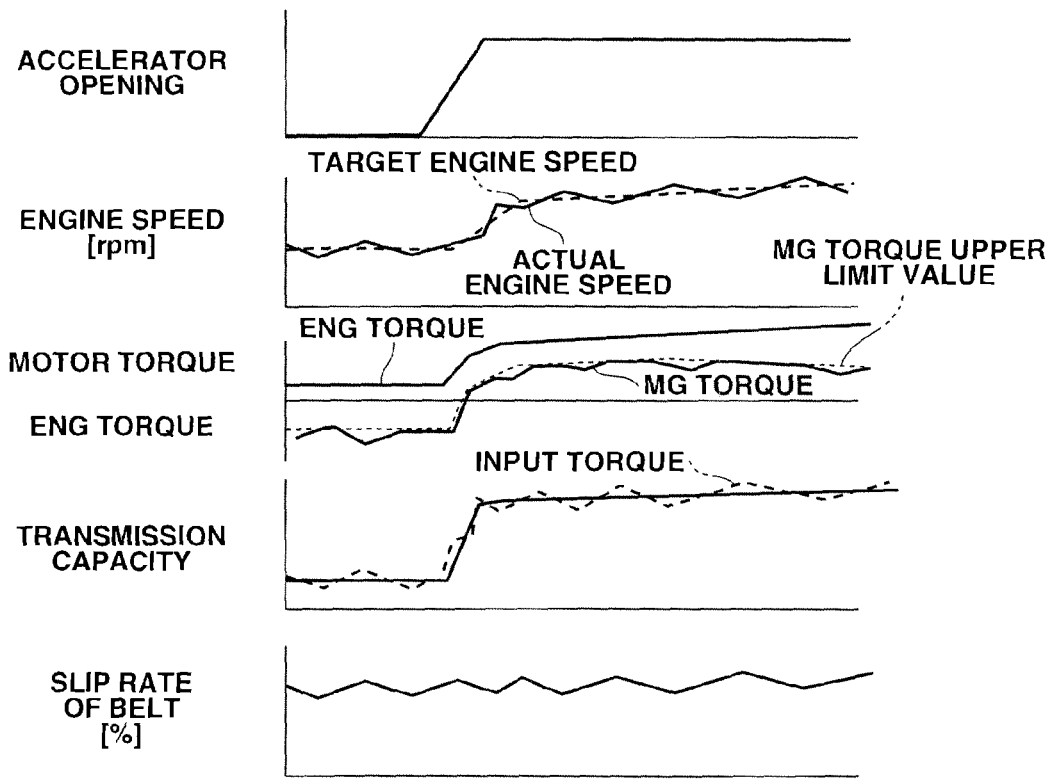
FIG. 21 is a time chart showing a slip rate control operation in an eleventh embodiment of the present invention.

FIG. 21 is a time chart showing a slip rate control operation of the eleventh embodiment. The motor generator torque is controlled so as to attain the target motor generator rotational speed. In this case, the torque is not outputted beyond the upper limit value of the motor generator torque. Accordingly, it is possible to improve the operability (possibility) of the desired torque of the driver and so on even when the motor generator torque is not directly controlled object. When the hydraulic pressure becomes the realizable lower limit during the acceleration (the hydraulic pressure does not decrease any more) and the slip rate does not become (reach) a slip rate in which the frictional coefficient between the belt and the pulley becomes optimum, motor generator MG excessively increases the torque to ensure the slip rate. On the other hand, in the eleventh embodiment, the upper limit value of the motor generator is set. Accordingly, even when the desired slip rate is not obtained, it is possible to suppress the motor generator torque within the predetermined allowable error from the desired torque. Therefore, it is possible to obtain the effects (1), (3) and (4) of the first embodiment, and the effect (6) of the fifth embodiment, and to further obtain effects described below.

(10) The upper limit value of the torque of motor generator (driving source) MG is set in accordance with the desired torque. Accordingly, even when the motor generator torque is controlled, it is possible to suppress the deviation from the desired torque, and to improve the operability (possibility) of the desired torque. Moreover, it is possible to combine the seventh embodiment and the tenth embodiment. In this case, it is possible to obtain the effects shown in the seventh embodiment.

Twelfth Embodiment

Next, a control apparatus for a belt-type continuously-variable transmission according to a twelfth embodiment of the present invention is illustrated. The control apparatus according to the twelfth embodiment is identical in a basic control configuration to the control apparatus according to the fifth embodiment. The following explanation is directed only to points different from the fifth embodiment, and repetitive explanation is omitted. In the fifth embodiment, the motor generator torque is controlled to attain the target motor generator rotational speed. In the twelfth embodiment, in addition to the above-described control configuration, a lower limit value of the motor generator torque is set, unlike the fifth embodiment. In a case in which the rotational speed of motor generator MG is controlled, the torque for attaining the rotational speed is set independently of the desired torque desired by the driver and so on. Accordingly, when the deviation (difference) between the target motor generator rotational speed and the actual motor generator rotational speed is large, the large torque command is outputted. In a case in which the lower limit value is not set during the deceleration, the torque (the excessive deceleration torque) larger than the desired torque (the torque generated at the deceleration) of the driver and so on is outputted, so that the driver feels the uncomfortable feelings. The lower limit value of the motor generator torque is set in accordance with the desired torque of the driver and so on. Specifically, the lower limit value of the motor generator torque is set so that the sum of the torque of motor generator MG and the engine torque does not exceed the sum (on the deceleration side) of the desired torque and a predetermined allowable error.

Figure 22:
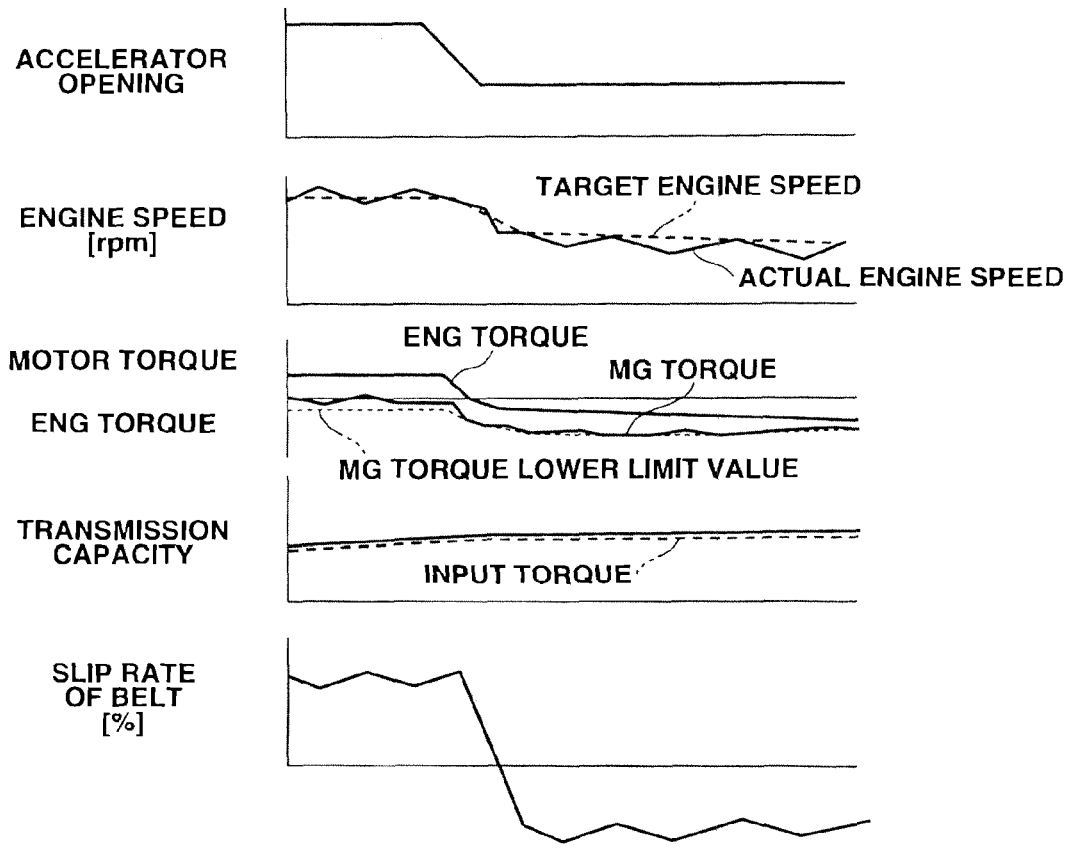
FIG. 22 is a time chart showing a slip rate control operation in a twelfth embodiment of the present invention.

FIG. 22 is a time chart showing a slip control operation of the twelfth embodiment. The motor generator torque is controlled so as to attain the target motor generator rotational speed. In this case, the torque is not outputted below the lower limit value of the motor generator torque. Accordingly, even when the motor generator torque is not directly the controlled object, it is possible to improve the operability (possibility) of the desired torque of the driver and so on. When the hydraulic pressure becomes the realizable lower limit value during the deceleration (when the hydraulic pressure does not decrease any more) and the slip rate does not become (reach) a slip rate in which the frictional coefficient between the belt and the pulley becomes optimum, the motor generator excessively generates the torque on the deceleration side to ensure the slip rate. On the other hand, in the twelfth embodiment, the lower limit value of the motor generator torque is set. Accordingly, even when the desired slip rate is not obtained, it is possible to suppress the motor generator torque within the predetermined allowable error from the desired torque. Therefore, it is possible to obtain the effects (1), (3) and (4) of the first embodiment and the effect (6) of the fifth embodiment, and to further obtain effects described below.

(11) The lower limit value of the torque of motor generator (driving source) MG is set in accordance with the desired torque. Accordingly, even when the motor generator torque is controlled, it is possible to suppress the deviation from the desired torque, and to improve the operability (possibility) of the desired torque without generating the excessive deceleration torque. Moreover, it is possible to combine the seventh embodiment and the tenth embodiment. In this case, it is possible to obtain the effects shown in the seventh embodiment.

Thirteenth Embodiment

Next, a control apparatus for a belt-type continuously-variable transmission according to a thirteenth embodiment of the present invention is illustrated. The control apparatus according to a thirteenth embodiment is identical in a basic control configuration to the control apparatus according to the second embodiment. The following explanation is directed only to points different from the second embodiment, and repetitive explanation is omitted. In the second embodiment, the engine torque is controlled to attain the desired slip rate. In the thirteenth embodiment, when the engine torque is adjusted, an ignition timing actuator and a throttle actuator are appropriately selected in accordance with the responsiveness, unlike the second embodiment.

Figure 23:
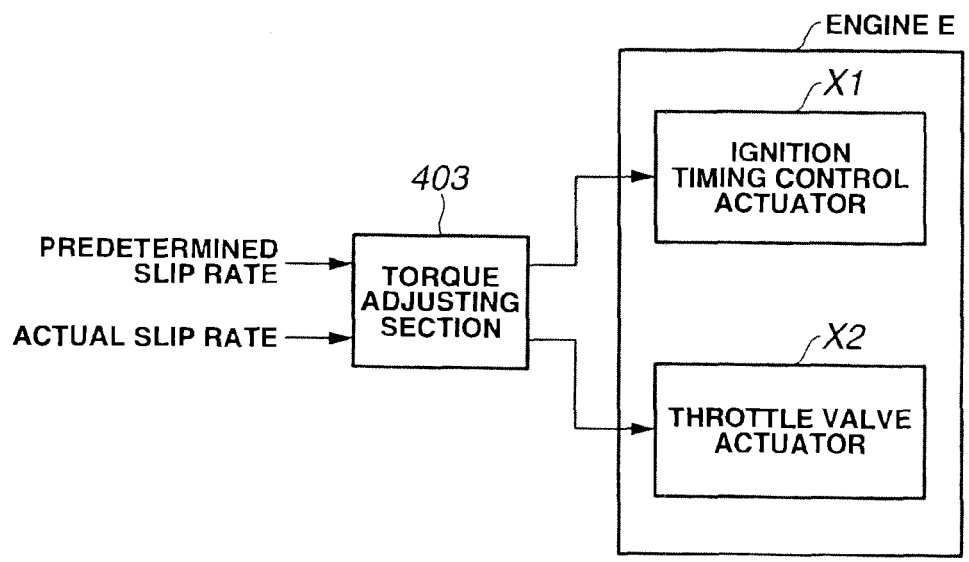
FIG. 23 is a control block diagram showing a structure (configuration) which outputs control commands to an ignition timing control actuator and a throttle valve actuator in a thirteenth embodiment of the present invention.

FIG. 23 is a control block diagram showing a control configuration which outputs control commands from a torque adjusting section 403, to an ignition timing control actuator X1 and a throttle valve actuator X2 which are arranged to control the engine torque. Torque adjusting section 403 is configured to calculate the deviation between the predetermined slip rate and the actual slip rate, and to output a torque-down command based on this deviation. In this case, the torque-down command is divided into a torque-down command of a high frequency component (high response component) and a torque-down command of a low frequency component (low response component). The torque-down command of the high frequency component is outputted to ignition timing control actuator X1. The torque-down command of the low frequency component is outputted to throttle valve actuator X2. That is, ignition timing control actuator X1 merely retards the ignition angle, and it is not necessary to consider the inertia and so on. Accordingly, it is possible to attain the torque-down of the high response. The sufficient torque-down may not be obtained only by ignition timing control actuator X1. On the other hand, in throttle valve actuator X2, it is necessary to consider the inertia and so on for adjusting the opening degree. The throttle valve actuator X2 only attains the torque-down of the response lower than the torque-down of the ignition timing control actuator X1. However, throttle valve actuator X2 can obtain the large torque-down amount. Therefore, the command to combine the both advantages is performed.

Figure 24:
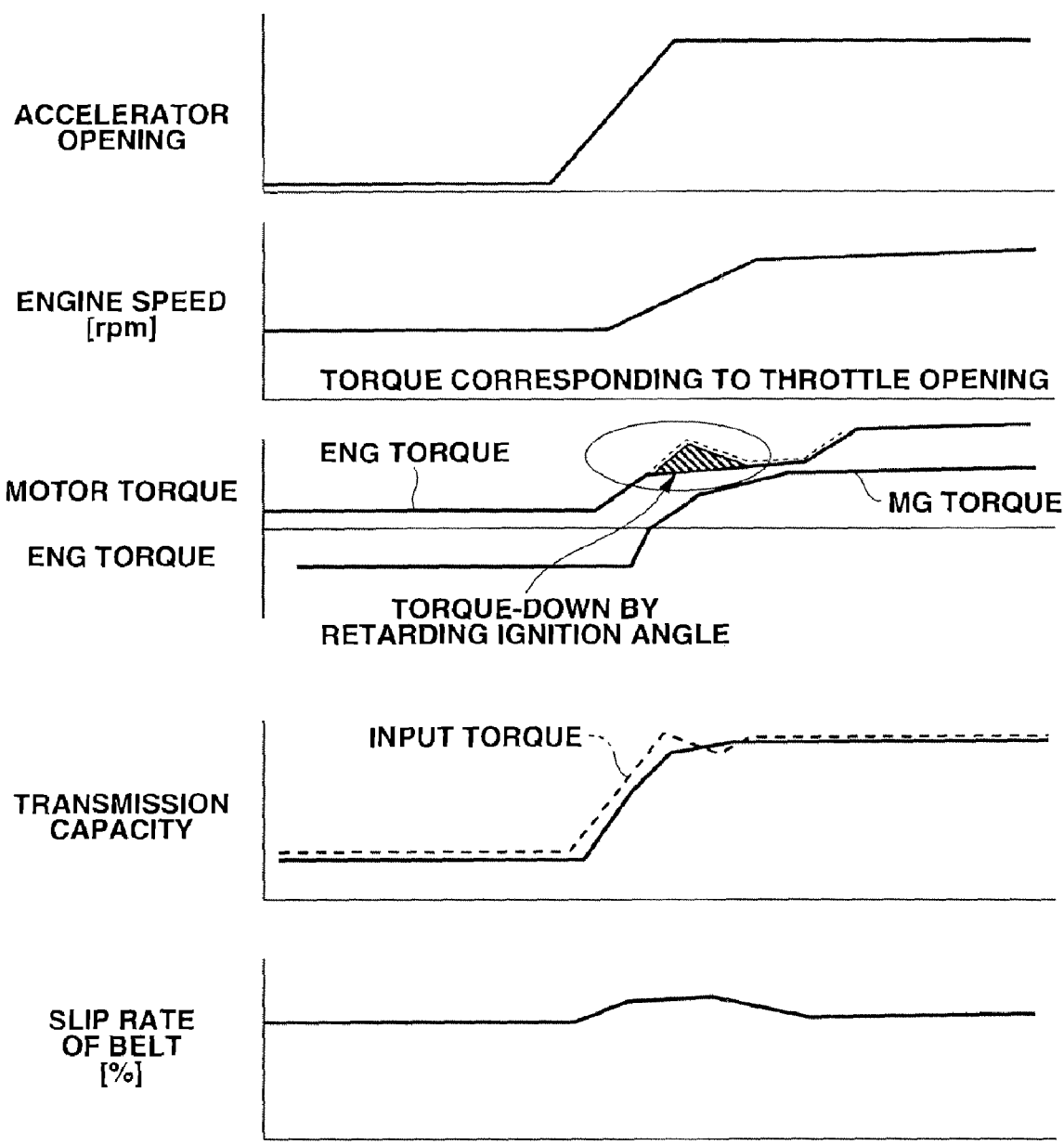
FIG. 24 is a time chart showing a slip rate control operation in the thirteenth embodiment.

FIG. 24 is a time chart showing a slip rate control operation of the thirteenth embodiment. When the slip rate between the pulley and the belt increases beyond the desired value, it is necessary to suppress the input torque. Accordingly, the torque-down command is outputted for decreasing the engine torque. In this case, the high response component is adjusted by the ignition timing control actuator X1, and the low response component is adjusted by throttle valve actuator X2. With this, it is possible to ensure the responsiveness and also the sufficient torque-down. In the thirteenth embodiment, these control operations are added to the second embodiment. However, these control operations of the thirteenth embodiment are applicable to the embodiments in which the torque control command is finally outputted to the engine. Accordingly, these control operations of the thirteenth embodiment are applicable to the first, second, fourth, sixth, eighth, ninth and tenth embodiments. Therefore, it is possible to attain the effects these embodiments, and to further attain effects described below.

(12) The high response component is adjusted by ignition timing control actuator (ignition timing varying control) X!. The low response component is adjusted by throttle valve actuator (intake air control) X2. With this, it is possible to obtain the responsiveness and the controlled variable at the control of the engine.

Fourteenth Embodiment

Next, a control apparatus for a belt-type continuously-variable transmission according to a fourteenth embodiment of the present invention is illustrated. The control apparatus according to the fourteenth embodiment is identical in a basic control configuration to the control apparatus according to the seventh embodiment. The following explanation is directed only to points different from the seventh embodiment, and repetitive explanation is omitted. In the seventh embodiment, it is not considered whether the slip is generated in primary pulley PP or secondary pulley SP (the selection of the slip state of primary pulley PP and secondary pulley SP is not referred). In the fourteenth embodiment, the slip state (the generation of the slip) of primary pulley PP and secondary pulley SP is selected in accordance with the running conditions, unlike the seventh embodiment. Hereinafter, the selection is illustrated in accordance with the running conditions.

Figure 25:
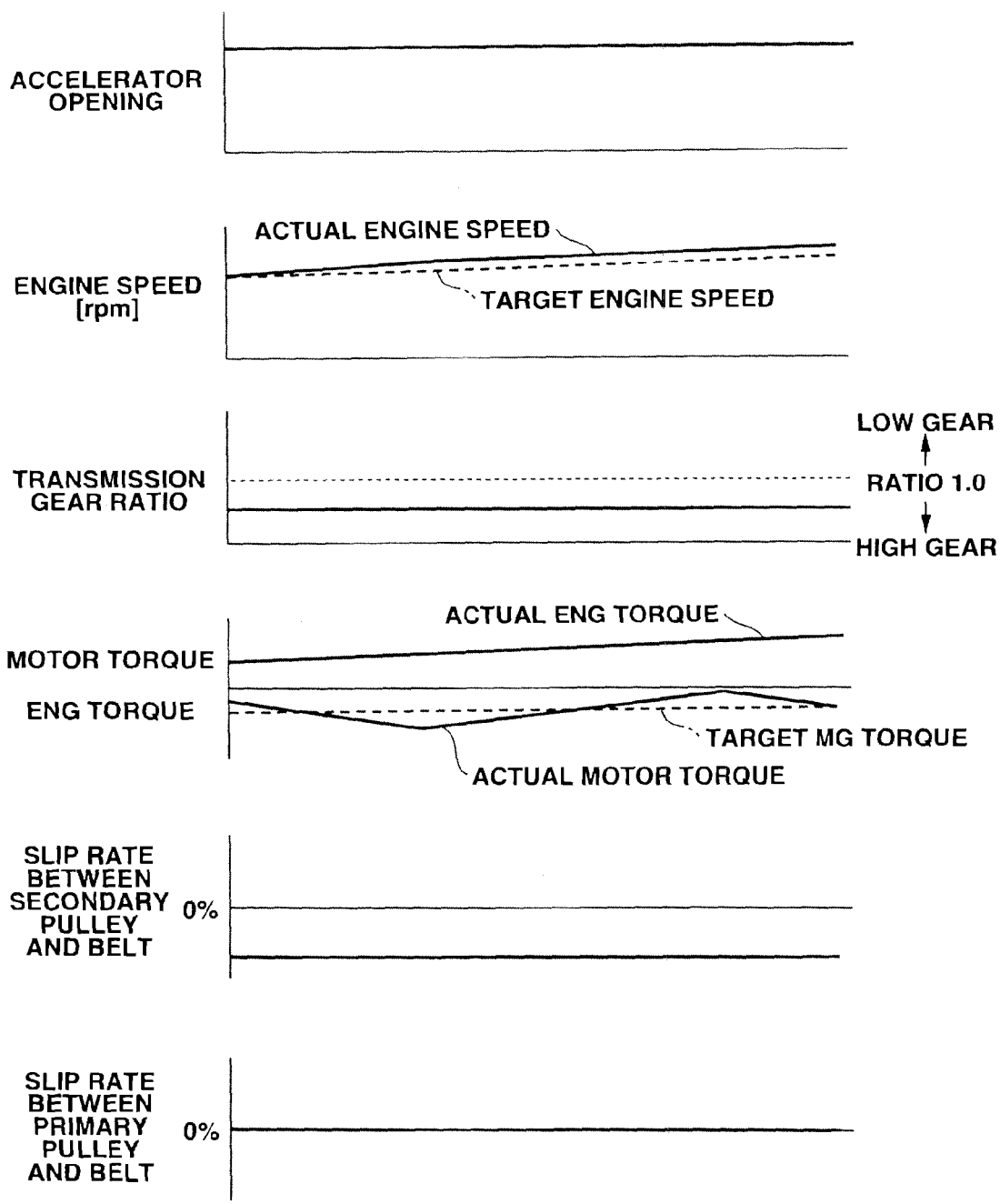
FIG. 25 is a time chart showing a slip rate control operation during an acceleration when a transmission gear ratio is a high transmission gear ratio side relative to 1 in a fourteenth embodiment of the present invention.

[During Acceleration and When Transmission Gear Ratio is High Transmission Gear Ratio Side relative to 1] "During the acceleration" is that the torque is transmitted from the primary pulley through the belt to the secondary pulley. "The high transmission gear ratio side" is that the belt winding diameter of the secondary pulley is smaller than the belt winding diameter of the primary pulley. Accordingly, in this running state, the secondary pulley is the capacity's side. The rotational speed of the secondary pulley is smaller than the speed of the belt since the vehicle is accelerated. As shown in the time chart of FIG. 25, the slip rate between the secondary pulley and the belt is set to a predetermined slip rate on the minus side. The slip rate between the primary pulley and the belt is set to substantially zero. Therefore, it is possible to attain the stable slip control.

Figure 26:
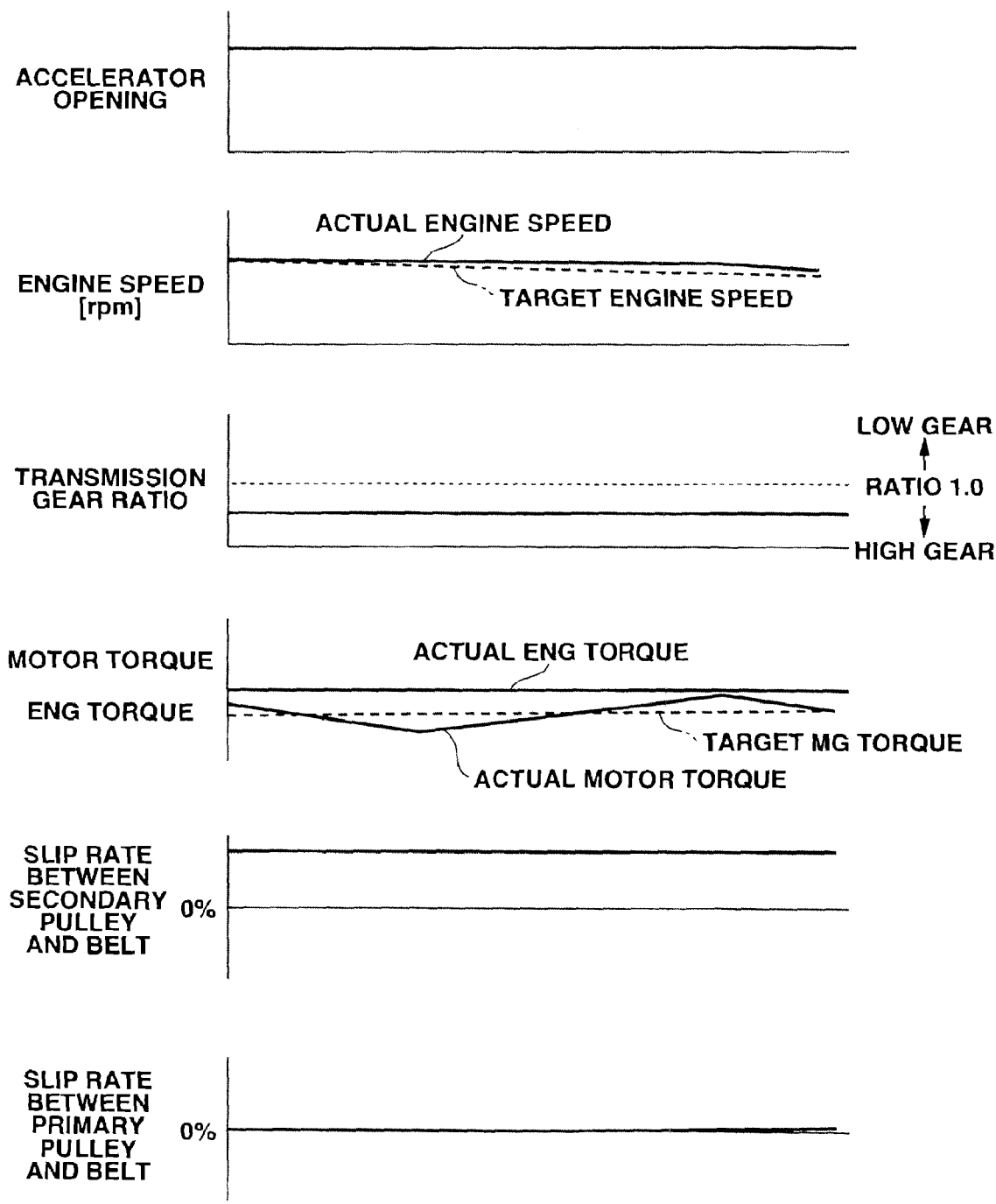
FIG. 26 is a time chart showing a slip rate control operation during a deceleration when the transmission gear ratio is the high transmission gear ratio side relative to 1 in the fourteenth embodiment.

[During Deceleration and When Transmission Gear Ratio is High Transmission Gear Ratio Side relative to 1] "During the deceleration" is that the torque is transmitted from the secondary pulley through the belt to the primary pulley. "The high transmission gear ratio side" is that the belt winding diameter of the secondary pulley is smaller than the belt winding diameter of the primary pulley. Accordingly, in this running state, the secondary pulley is the capacity's side. The rotational speed of the secondary pulley is larger than the speed of the belt since the vehicle is decelerated. As shown in the time chart of FIG. 26, the slip rate between the secondary pulley and the belt is set to a predetermined slip rate on the plus side. The slip rate between the primary pulley and the belt is set to substantially zero. Accordingly, it is possible to attain the stable slip control.

Figure 27:
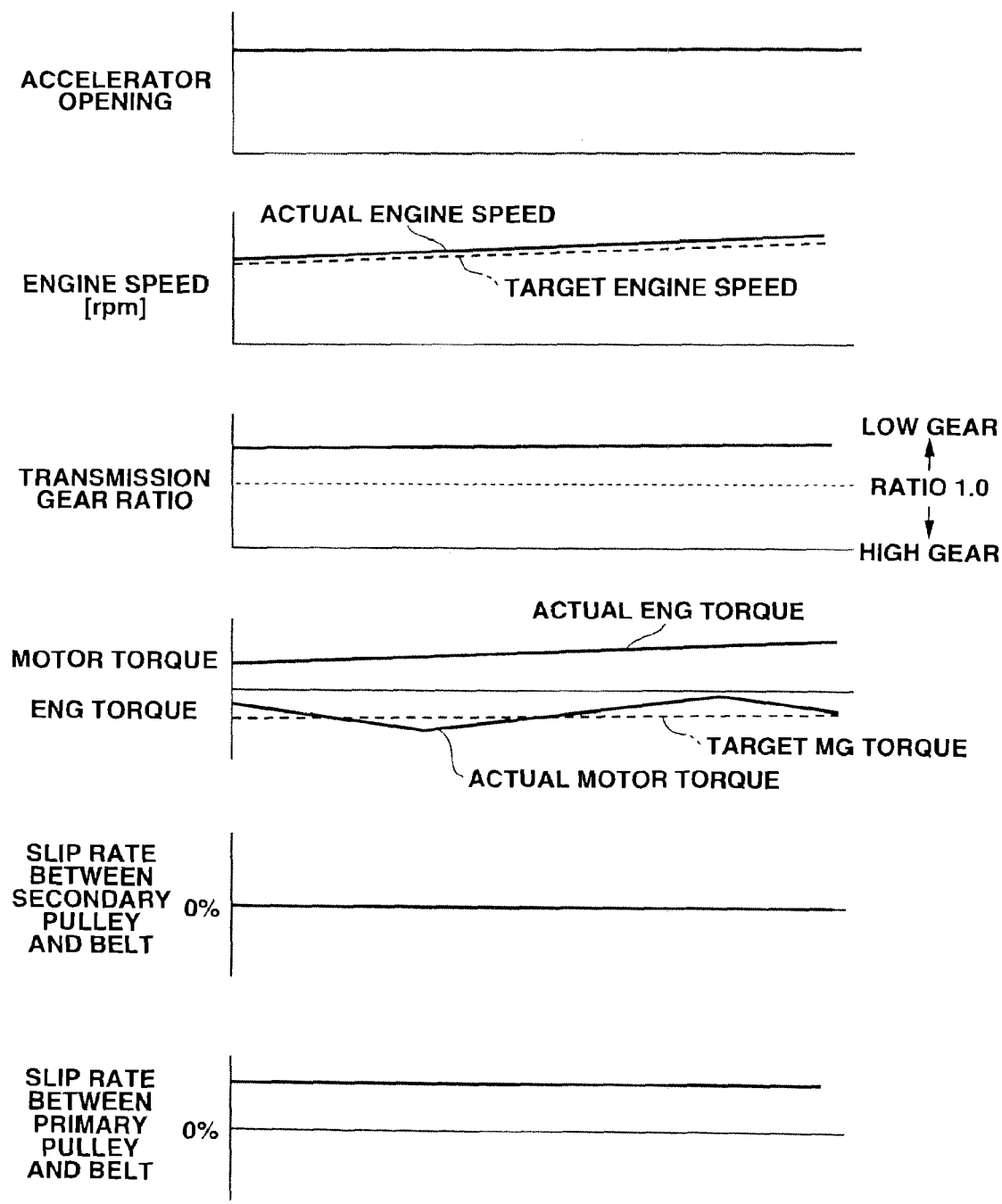
FIG. 27 is a time chart showing a slip rate control operation during the acceleration when the transmission gear ratio is a low transmission gear ratio side relative to 1 in the fourteenth embodiment.

[During Acceleration and When Transmission Gear Ratio is Low Transmission Gear Ratio Side relative to 1] "During the acceleration" is that the torque is transmitted from the primary pulley through the belt to the secondary pulley. "The low transmission gear ratio side" is that the belt winding diameter of the primary pulley is smaller than the belt winding diameter of the secondary pulley. Accordingly, in this running state, the primary pulley is the capacity's side. The rotational speed of the primary pulley is larger than the speed of the belt since the vehicle is accelerated. As shown in the time chart of FIG. 27, the slip rate between the primary pulley and the belt is set to a predetermined slip rate on the plus side. The slip rate between the secondary pulley and the belt is set to substantially zero. Therefore, it is possible to attain the stable slip control.

Figure 28:
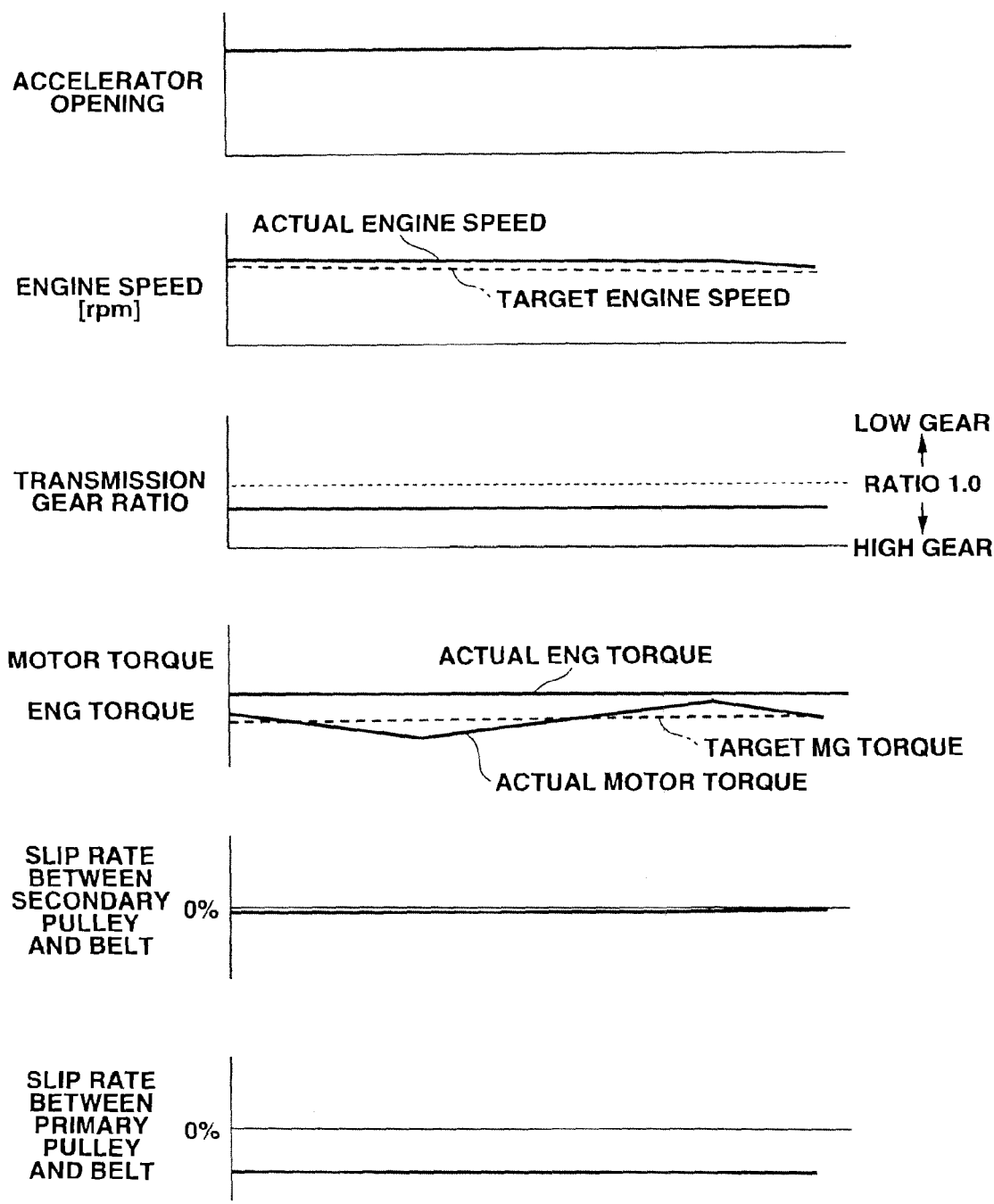
FIG. 28 is a time chart showing a slip rate control operation during the deceleration when the transmission gear ratio is the low transmission gear ratio side relative to 1 in the fourteenth embodiment.

[During Deceleration and When Transmission Gear Ratio is Low Transmission Gear Ratio relative to 1]"During the deceleration" is that the torque is transmitted from the secondary pulley through the belt to the primary pulley. "The low transmission gear ratio side" is that the belt winding diameter of the primary pulley is smaller than the belt winding diameter of the secondary pulley. Accordingly, in this running state, the primary pulley is the capacity's side. The rotational speed of the primary pulley is smaller than the speed of the belt since the vehicle is decelerated. As shown in the time chart of FIG. 28, the slip rate between the primary pulley and the belt is set to a predetermined slip rate on the minus side. The slip rate between the secondary pulley and the belt is set to substantially zero. Accordingly, it is possible to attain the stable slip rate control.

(13) When a transmission gear ratio is at a high transmission gear ratio side relative to 1 during an acceleration, the torque control section is configured to cause the slip state so that a speed of the belt is larger than a (rotational) speed of the secondary pulley. When the transmission gear ratio is at a high transmission gear ratio side relative to 1 during the deceleration, the torque control section is configured to cause the slip state so that the speed of the belt is smaller than the (rotational) speed of the secondary pulley. When the transmission gear ratio is equal to or at a low transmission gear ratio side relative to 1 during the acceleration, the torque control section is configured to cause the slip state so that the speed of the belt is smaller than a (rotational) speed of the primary pulley. When the transmission gear ratio is equal to or at a low transmission gear ratio side relative to 1 during the deceleration, the torque control section is configured to cause the slip state, so that the speed of the belt is larger than the (rotational) speed of the primary pulley. Therefore, it is possible to accelerate and decelerate to hold the proper slip state in accordance with the running state.

Fifteenth Embodiment

Next, a control apparatus for a belt-type continuously-variable transmission according to a fifteenth embodiment of the present invention is illustrated. The first to fourteenth embodiments are applied to the hybrid vehicle with the motor generator. The fifteenth embodiment is applied to a normal engine vehicle which is not provided with the motor generator and so on.

Figure 29:
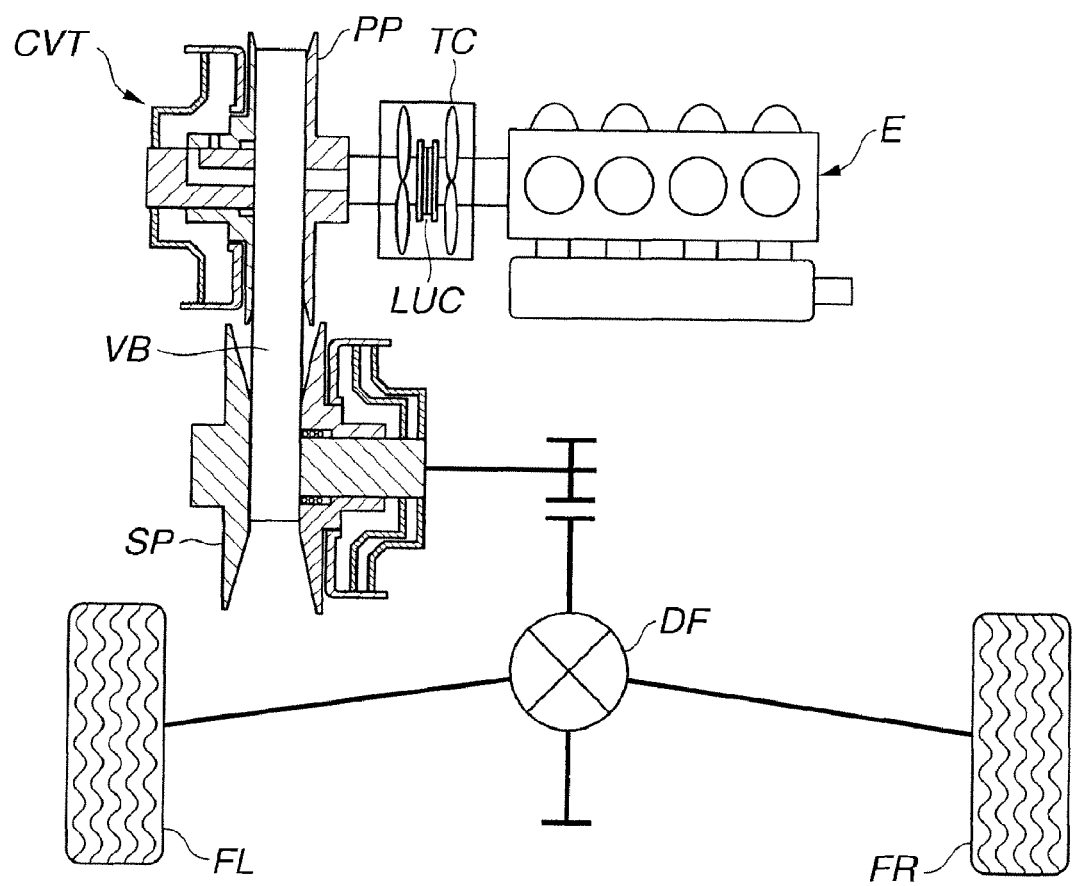
FIG. 29 is a schematic diagram showing an engine vehicle employing a belt-type continuously-variable transmission according to a fifteenth embodiment of the present invention.

FIG. 29 is a schematic diagram showing an engine vehicle with a belt-type continuously-variable transmission. A driving force (torque or engine speed) of an internal combustion engine E is inputted through a torque converter TC to primary pulley PP of belt-type continuously-variable transmission CVT. Torque converter TC is provided with a lockup clutch LUC. Lockup clutch LUC is disengaged when the vehicle speed is smaller than a predetermined speed, so that torque converter TC amplifies the torque. Moreover, lockup clutch LUC is engaged to directly connect engine E and belt-type continuously-variable transmission CVT when the vehicle speed is equal to or greater than the predetermined speed. The driving force outputted from belt-type continuously-variable transmission CVT is outputted through the differential gear DF to driving wheels FR, FL. These structures are well-known structure, and explanation is omitted.

Figure 30:
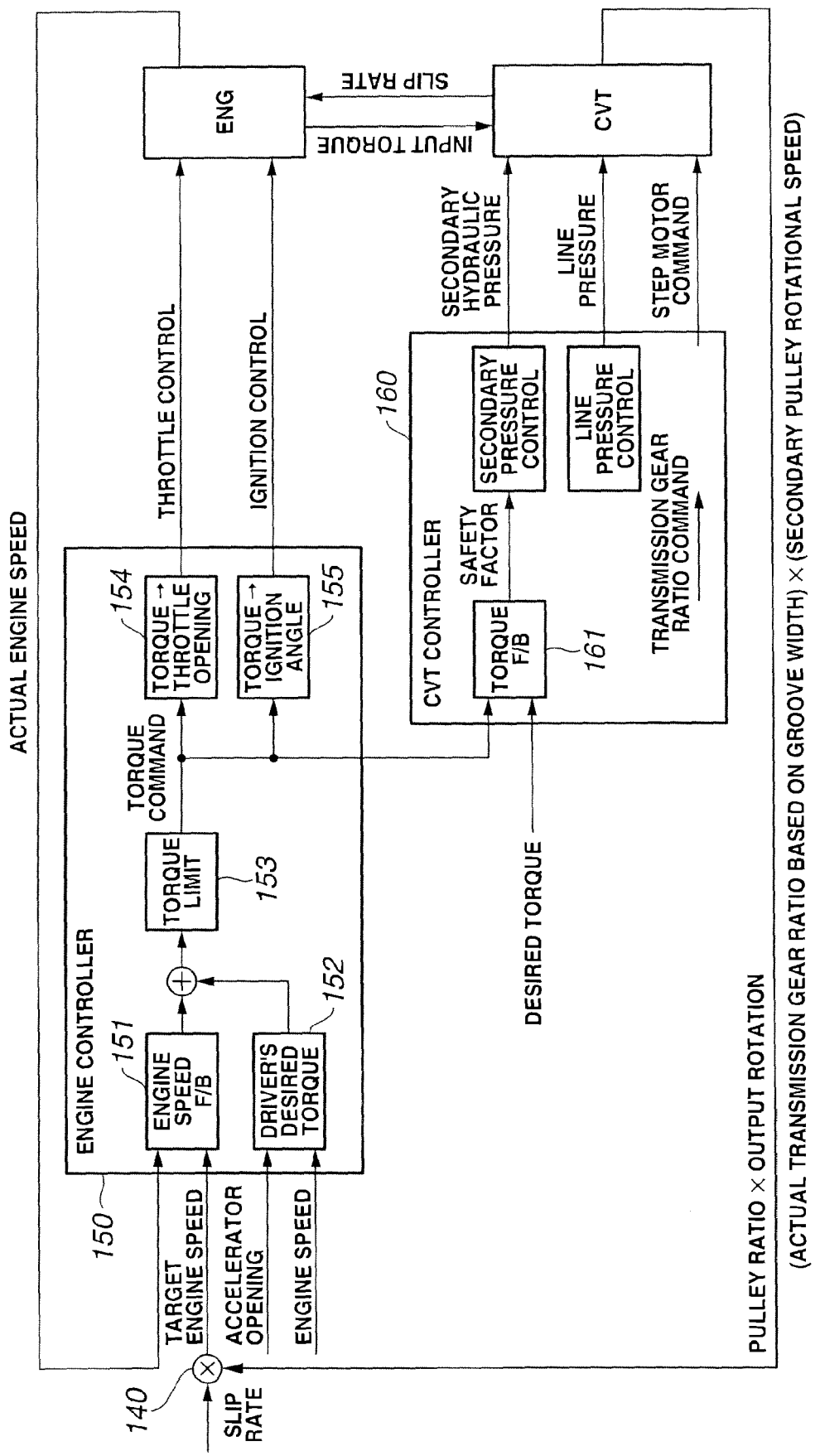
FIG. 30 is a control block diagram showing a slip control operation in the fifteenth embodiment.

FIG. 30 is a control block diagram showing a slip rate control operation of the fifteenth embodiment. An engine speed control section 150 includes a target engine speed calculating section 140; an engine speed feedback control section 151; a desired torque calculating section 152 configured to calculate a desired torque of the driver and so on; a torque limit section 153 configured to restrict (limit) the command torque; a throttle control section 154 configured to convert the low response (component) of the command torque, to the command to the throttle valve actuator; and an ignition angle control command section 155 configured to convert the high response (component) of the command torque, to the command to the ignition timing control actuator.

Target engine speed calculating section 140 calculates the target engine speed by multiplying the desired slip rate (1.02 when the slip rate of 2% is desired to be obtained) and the product of the rotational speed of the secondary pulley and the actual transmission gear ratio calculated based on the groove width (the belt winding diameter indicative of the diameter of the belt wound around the pulley). The product of the rotational speed of the secondary pulley and the actual transmission gear ration calculated based on the groove width is the rotational speed of the primary pulley (the engine speed) when the slip is not generated at all. By multiplying the desired slip rate (1.02 corresponding to 2%) and the product of the rotational speed of the secondary pulley and the actual transmission gear ratio calculated based on the groove width, the desired slip rate between the pulley and the belt is obtained.

Engine speed feedback control section 151 calculates a correction quantity of the engine torque by the PI control based on the deviation between the calculated target engine speed and the sensed actual engine speed. That is, engine speed feedback control section 151 outputs the correction command to increase the engine torque when the engine speed does not become (reach) the target engine speed. Engine speed feedback control section 151 outputs the correction command to decrease the engine torque when the engine speed exceeds the target engine speed. Desired torque calculating section 152 calculates the desired torque of the driver based on the accelerator opening and the engine speed. The above-described torque correction command is added to this desired torque. That is, it is possible to ensure the desired torque of the driver and simultaneously to control the engine torque to attain the target engine speed.

In torque limit section 153, an upper limit value and a lower limit value are set in accordance with the desired torque so that the actual command torque is not deviated from the desired torque of the driver. Torque limit section 153 is configured to directly output the command torque when the command torque is between the upper limit value and the lower limit value. Torque limit section 153 is configured to output the upper limit value or the lower limit value when the command torque exceeds the upper limit value or the lower limit value.

CVT controller 160 includes a transmission capacity control section 161 and other control sections. The other control sections are a secondary pressure control section configured to output a transmission capacity determined by transmission capacity control section 161, a line pressure control section configured to control the line pressure, a transmission gear ratio control section configured to output a step motor command and so on when a mechanical feedback mechanism is provided, and so on.

Transmission capacity control section 161 receives a final torque command outputted from torque limit section 153, and the desired torque of the engine which is calculated based on the desired torque (the desired driving force). Transmission capacity control section 161 calculates the transmission capacity by the PI control based on the deviation between the torque command and the desired torque. In case of controlling the slip rate between the pulley and the belt, the stable slip rate can be obtained by controlling the engine speed. However, when the slip rate is extremely large, the command to decrease the engine torque is outputted so as to decrease the engine speed. That is, the actual torque becomes smaller than the driving force (desired torque) desired by the driver and so on in accordance with the reduction of the torque, so that the driver feels the uncomfortable feeling.

In the fifteenth embodiment, the controller outputs the transmission capacity in accordance with the deviation (difference) between the desired torque and the actual torque, to belt-type continuously-variable transmission CVT. For example, when the torque command is smaller than the desired torque, the high transmission capacity is outputted. Consequently, the pulley pressing force increases, and it is difficult to generate the slip between the belt and the pulley. In engine E, it is necessary to increase the engine speed since the slip is not obtained. Consequently, the engine torque is increased. That is, when the transmission capacity is increased, the torque of engine E whose the engine speed is controlled is controlled to increase. With this, it is possible to attain the desired torque, and also to obtain the stable slip rate.

In the hybrid vehicles shown in the first to fourteenth embodiments of the present invention, in case of controlling the engine speed, the value corresponding to the desired torque is not inputted to the engine, and the desired torque is ensured by the motor generator. However, the normal engine vehicle does not have the above mentioned structure to ensure the torque. Accordingly, the desired torque is attained by the engine speed control, and the desired engine torque is corrected by the engine speed control. In this fifteenth embodiment, it is possible to attain the effects (1) and (2) shown in the first embodiment, the effect (5) shown in the fourth embodiment, and the effect (7) shown in the sixth embodiment. Moreover, it is optional to combine the other embodiments, except for the control of the motor generator. In this case, it is possible to obtain the effects of the combined embodiments.

Although the first to fifteenth embodiments of the present invention have been described above, the invention is not limited to the embodiments described above. Various forms and modifications are included as long as they are not deviated from the gist of the invention. For example, in the embodiments, the FF type vehicle is illustrated. However, the present invention is applicable to an FR-type vehicle. Moreover, a forward and rearward switching mechanism is not specifically shown. In a case in which the forward and rearward switching mechanism and so on is provided on the input side of the belt-type continuously-variable transmission, a frictional element provided to the forward and rearward switching mechanism may be used as second clutch CL2. Moreover, a new second clutch CL2 may be added.

Sixteenth Embodiment

First, a driving system of a hybrid vehicle is illustrated. FIG. 1 is a schematic diagram showing a front-wheel drive hybrid vehicle which employs a belt-type continuously-variable transmission according to the sixteenth embodiment of the present invention. As shown in FIG. 1, the driving system includes an engine E, a first clutch CL1, a motor generator MG, a second clutch CL2, a belt-type continuously-variable transmission CVT, a differential DF, a left drive shaft DSL, a right drive shaft DSR, a left front wheel (driving wheel) FL, a right front wheel (driving wheel) FR, a left rear wheel RL and a right rear wheel RR.

Engine E is, for example, a gasoline engine. An ignition timing, valve openings of throttle valves and so on of engine E are controlled based on a control command from an engine controller 1 described later. A flywheel FW is provided to an engine output shaft.

First clutch CL1 is disposed between engine E and motor generator MG. First clutch CL1 is controlled to engage or disengage through slip engagement by a control hydraulic pressure produced by a first clutch hydraulic unit 6 based on a control command from a first clutch controller 5 described later.

Motor generator MG is a synchronous motor generator including a rotor having permanent magnets embedded in the rotor, and a stator having stator coils wound around the stator. Motor generator MG is controlled by being applied with three-phase alternating current (AC) produced by an inverter 3 based on a control command from a motor controller 2 described later. This motor generator MG serves as an electric motor arranged to rotate by receiving a supply of the electric power from a battery 4 (hereinafter, referred to as a power running), and serves as a generator arranged to generate an electromotive force between both ends of each stator coil when the rotor is rotated by the external force, and thereby to charge battery 4 (hereinafter, referred to as a regeneration). The rotor of motor generator MG is connected through a damper (not shown) to an input shaft of the belt-type continuously-variable transmission CVT.

Second clutch CL2 is disposed between motor generator MG and belt-type continuously-variable transmission CVT. Second clutch CL2 is controlled to engage or disengage through slip engagement by a control hydraulic pressure produced by a second clutch hydraulic unit 8a based on a control command from CVT controller 7 described later.

Belt-type continuously-variable transmission CVT includes a primary pulley PP arranged to receive a torque of engine E and/or a torque of motor generator MG; a secondary pulley SP arranged to output the torque to driving wheels FL, FR; and a belt VB wound around primary and secondary pulleys PP and SP. Belt-type continuously-variable transmission CVT is a well-known transmission. Belt-type continuously-variable transmission CVT varies a pulley groove width in accordance with a pulley hydraulic pressure supplied to each pulley by the hydraulic pressure control, and continuously varies a transmission gear ratio (reduction ratio) (in a stepless manner). A CVT controller 7 described later is configured to output a control command to automatically vary the transmission gear ratio (shift) in accordance with a vehicle speed, an accelerator opening and so on. The hydraulic pressure of primary pulley PP and the pressing force of secondary pulley SP are controlled by a control hydraulic pressure produced by a pulley hydraulic unit 8b based on this control command so as to vary the transmission gear ratio.

The belt-type continuously-variable transmission CVT according to the first embodiment includes the step motor. The line pressure regulated by the line pressure solenoid is supplied to the primary pulley PP. The secondary pressure regulated by the secondary pressure solenoid is supplied to the secondary pulley SP. In the belt-type continuously-variable transmission according to the sixteenth embodiment, the pulley to which the high pressure is supplied is the pulley on the capacity side.

An output shaft of belt-type continuously-variable transmission CVT is connected with left and right front wheels FL and FR through differential gear DF, left drive shaft DSL and right drive shaft DSR. Each of first and second clutches CL1 and CL2 is a wet-type multiple-plate clutch in which a hydraulic pressure and a flow rate of the hydraulic fluid can be continuously controlled by a proportional solenoid. However, each of first and second clutches CL1 and CL2 may be a dry-type clutch and so on. Each of first and second clutches CL1 and CL2 is not limited to the wet-type multiple-plate clutch.

This hybrid drive system includes an EV running mode, an HEV running mode, and a WSC running mode which are selected in accordance with the engagement and the disengagement of first clutch CL1. The EV running mode is an electric vehicle running mode which is a motor-use running mode in which the vehicle runs only by the motor generator MG in the disengagement state of first clutch CL1. The HEV running mode is an engine-use running mode in which the vehicle runs by the power source including engine E in the engagement state of first clutch CL1. The WSC running mode is an engine-use slipping running mode in which the vehicle runs by the power source including engine E in the engagement state of first clutch CL1 and in a slip state of second clutch CL2. In this WSC mode, the vehicle can perform a creep running especially when the battery SOC is low and the engine water temperature is low. When the vehicle shifts from the EV running mode to the HEV running mode, first clutch CL1 is engaged, and the engine starts by using the torque of motor generator MG.

The HEV running mode includes an engine running mode, a motor assist running mode, and an electric generation running mode. In the engine running mode, the driving wheels are driven by using engine E only as the power source. In the motor assist running mode, the driving wheels are driven by using engine E and motor generator MG as the power source. In the electric generation running mode, driving wheels FL and FR are driven by using engine E as the power source, and simultaneously motor generator MG is operated as the electric generator. In the constant speed running or in the acceleration running, motor generator MG is operated as the electric generator by using the power of engine E. In the deceleration running, motor generator MG regenerates the brake energy, and performs the electric generation to charge battery 4. Moreover, there is an electric generation mode in which motor generator MG is operated as the electric generator by using the power of engine E at the stop of the vehicle.

Next, the control system of the hydraulic vehicle is illustrated. As shown in FIG. 1, the control system of the hydraulic vehicle includes engine controller 1, motor controller 2, inverter 3, battery 4, first clutch controller 5, first clutch hydraulic unit 6, CVT controller 7, second clutch hydraulic unit 8a, a brake controller 9, and an integrated controller 10. Engine controller 1, motor controller 2, first clutch controller 5, CVT controller 7, brake controller 9 and integrated controller 10 are connected with each other through CAN communication lines (CAN lines) 11 capable of exchanging information with each other.

Engine controller 1 receives information (signal) of an engine speed from an engine speed sensor 12. Engine controller 1 outputs a command to control an engine operating point (Ne: engine speed, Te: engine torque) in accordance with a target engine torque command and so on from integrated controller 10, to an ignition timing control actuator (not shown), a throttle valve actuator (not shown) and so on. The information of engine speed Ne and so on is supplied through CAN communication lines 11 to integrated controller 10.

Motor controller 2 receives information (signal) from a resolver 13 configured to sense a rotary position of the rotor of motor generator MG. Motor controller 2 outputs, to inverter 3, a command to control a motor operating point of motor generator MG (Nm: motor generator rotational speed, Tm: motor generator torque) in accordance with a target motor generator torque command and so on from integrated controller 10. This motor controller 2 monitors a battery SOC indicative of a charge state of battery 4. The information of battery SOC is used as the information for controlling motor generator MG, and supplied through CAN communication lines 11 to integrated controller 10.

First clutch controller 5 receives sensor information (signals) from a first clutch hydraulic sensor 14 and a first clutch stroke sensor 15. First clutch controller 5 outputs, to first clutch hydraulic unit 6, a command to control the engagement/disengagement of first clutch CL1 in accordance with a first clutch control command from integrated controller 10. The information of first clutch stroke C1S is supplied through CAN communication lines 11 to integrated controller 10.

CVT controller 7 receives sensor information (signals) from an accelerator opening sensor 16, a vehicle speed sensor 17, and a second clutch hydraulic pressure sensor 18, and an inhibitor switch arranged to output a signal corresponding to a position of a shift lever. CVT controller 7 outputs, to second clutch hydraulic unit 8*a* in a CVT hydraulic pressure control valve, a command to control the engagement/disengagement of second clutch CL2 in accordance with a second clutch control command from integrated controller 10. CVT controller 7 has a transmission gear ratio map to determine a target transmission gear ratio based on the vehicle speed VSP and the accelerator opening APO. CVT controller 7 determines the target transmission gear ratio based on the inputted sensor information. Moreover, CVT controller 7 determines the line pressure and the secondary pulley hydraulic pressure in accordance with a transmission capacity command or transmitting capacity command from integrated controller 10. CVT controller 7 outputs a step motor driving command to pulley hydraulic unit 8*b* to obtain a pulley groove width to attain the target transmission gear ratio. The information of the inhibitor switch, accelerator opening APO, and vehicle speed VSP are supplied through CAN communication lines 11 to integrated controller 10.

Brake controller 9 receives sensor information (signals) from wheel speed sensors 19 each arranged to sense a wheel speed of one of the four wheels, and a brake stroke sensor 20. When a desired braking force determined from a brake stroke BS is not satisfied only by the regenerative braking force at a braking performed by compression of a brake pedal, brake controller 9 performs a regenerative cooperative brake control based on a regenerative cooperative control command from integrated controller 10 to compensate deficiency of the braking force by a mechanical braking force (the brake force by the frictional brake).

Integrated controller 10 monitors energy consumption of the entire of the vehicle, and operates to run the vehicle at peak efficiency (maximum efficiency). Integrated controller 10 receives information (signal) from a motor rotational speed sensor 21 arranged to sense a motor rotational speed Nm, information (signal) from a second clutch output rotational speed sensor 22 arranged to sense a second clutch output rotational speed N2out, information (signal) from a second clutch torque sensor 23 arranged to sense a second transmission torque capacity TCL2, information (signal) from a brake hydraulic pressure sensor 24, information (signal) from a transmission gear ratio sensor 10*a* arranged to sense an actual transmission gear ratio from a pulley groove width, information (signal) from a secondary rotational speed sensor 10*b* arranged to sense a rotational speed of secondary pulley SP, and information (signals) obtained through CAN communication lines 11.

Integrated controller 10 controls engine E by the control command to engine controller 1, and controls motor generator MG by the control command to motor generator 2. Integrated controller 10 controls the engagement and the disengagement of first clutch CL1 by the control command to first clutch controller 5, and controls the engagement, the disengagement and the transmission (transmitting) capacity of second clutch CL2 by the control command to CVT controller 7. Moreover, integrated controller 10 outputs the transmission capacity command and the transmission gear ratio command of the CVT. These calculations may be performed in the integrated controller 10 or the other controllers.

Hereinafter, the control calculation performed in integrated controller 10 in the sixteenth embodiment is illustrated with reference to the block diagrams shown in FIG. 2 and FIG. 31. For example, integrated controller 10 performs this calculation at a control cycle of 10 msec. Integrated controller 10 includes a target drive force calculating section 100, a mode selecting section 200, a target charge-and-discharge calculating section 300, and an operating point command section 400.

Target drive force calculating section 100 calculates a target driving force tFo0 from accelerator opening APO and vehicle speed VSP by using a target driving force map shown in FIG. 3.

FIG. 5 is a view showing a mode map. Mode selecting section 200 selects a target mode based on the mode map by using accelerator opening APO and vehicle speed VSP. In the mode map, there are provided the EV running mode, the WSC running mode, and the HEV running mode. Mode selecting section 200 selects the target mode from accelerator opening APO and vehicle speed VSP. However, even when the EV running mode is selected, the target mode is forcibly set to the HEV running mode or the WSC running mode if the battery SOC is equal to or smaller than a predetermined quantity. Moreover, the mode selecting section 200 receives a temperature of battery 4 which is sensed by a temperature sensor (not shown). Accordingly, even in a case in which the EV running mode is selected, the target mode is forcibly shifted to the HEV running mode or the WSC running mode when the temperature of battery 4 is smaller than a threshold value on the low temperature side or when the temperature of battery 4 is higher than a threshold value on the high temperature side.

Target charge-and-discharge calculating section 300 calculates a target charge-and-discharge electric power tP from the battery SOC by using a target charge-and-discharge amount map shown in FIG. 4. In the target charge-and-discharge amount map, an EVON line to permit the EV running mode is set to SOC=50%, and an EVOFF line to prohibit the EV running mode is set to SOC=35%.

When the battery SOC is equal to or greater than 50% (SOC≧50%), the EV running mode region appears in the mode map of FIG. 5. In a case in which the EV running mode region appears once in the mode map of FIG. 5, this EV running mode region continues to exist in the mode map until the battery SOC is smaller than 35%. When the battery SOC is smaller than 35% (SOC<35%), the EV running mode disappears from the mode map of FIG. 5. In a case in which the EV running mode region disappears from the mode map, this EV running mode region continues to disappear from the mode map until the battery SOC is equal to or greater than 50%.

Operating point command section 400 calculates, as a target operating point, a transient target engine torque, a target motor generator torque, a target second clutch engagement capacity (a control command of the second clutch), a target transmission capacity (a transmission capacity command of the pulley hydraulic pressure and so on) of the belt-type continuously-variable transmission, and a first clutch solenoid current command which is a transmission torque capacity (a first clutch control command) of first clutch CL1, from accelerator opening APO, target driving force tFo0, the target mode, vehicle speed VSP, and target charge-and-discharge electric power tP. For example, the target engine torque is calculated to be outputted in accordance with an optimum fuel economy line α. The target motor generator torque is calculated based on the deviation between the calculated target engine torque and the target driving force fFo0. Operating point command section 400 includes an engine start control section 401 configured to start engine E at the transition from the EV running mode to the HEV running mode. In the first embodiment, the target transmission capacity is set in accordance with the desired torque (target driving force fFo0) of the driver and so on.

Operating point command section 400 further includes a slip rate calculating section 402 configured to calculate an actual slip rate generated between the belt and the pulley (the primary pulley or the secondary pulley) of the belt-type continuously-variable transmission CVT; and a driving source control section 404" configured to control the motor generator torque in accordance with a deviation between a predetermined slip rate (about 2%) and the actual slip rate calculated in slip rate calculating section 402, and a transmission capacity control section 405' configured to control the transmission capacity in accordance with the deviation between the desired torque and the actual torque.

Figure 31:
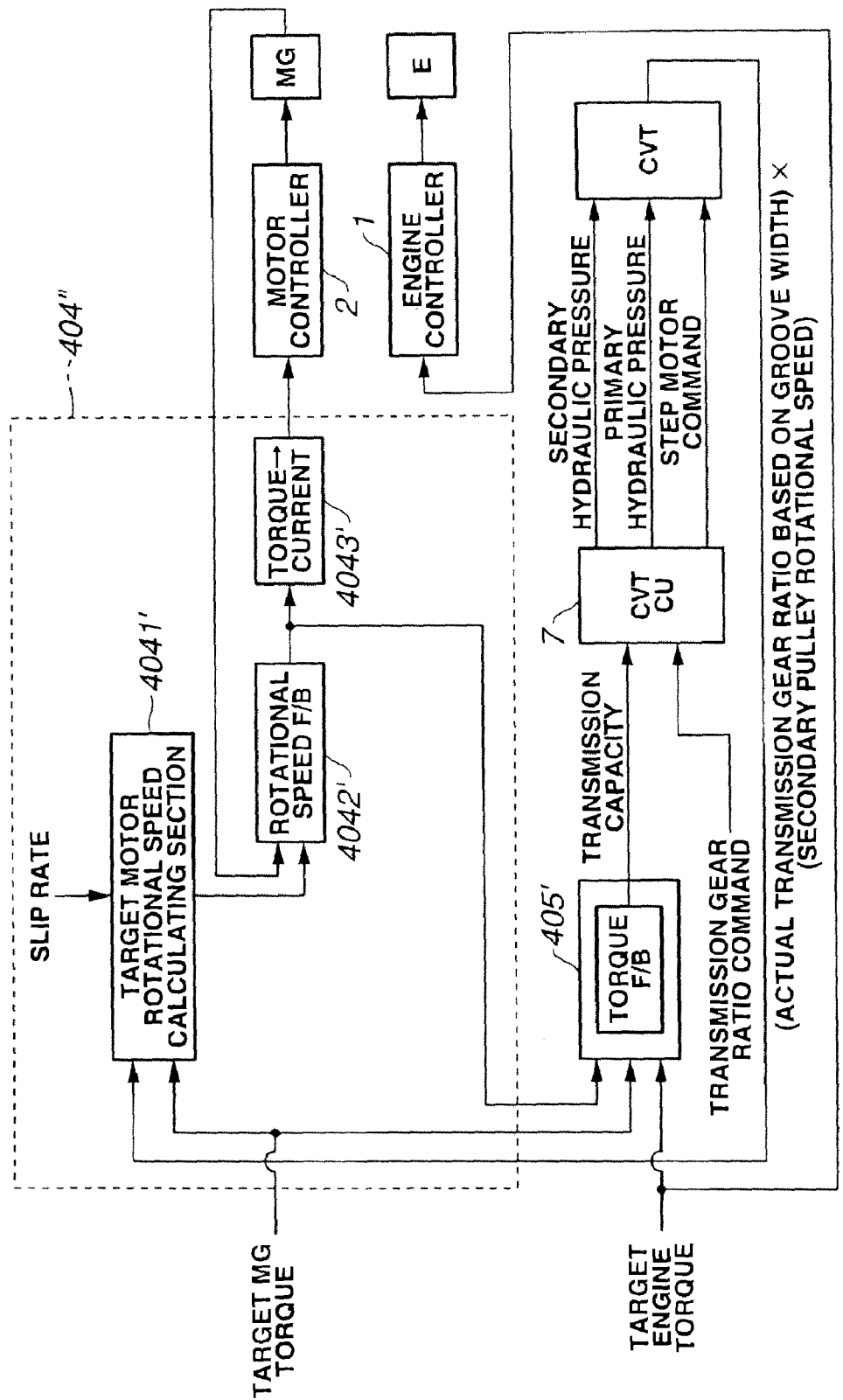
FIG. 31 is a block diagram showing a control configuration of a motor generator rotational speed control section in a sixteenth embodiment of the present invention.

FIG. 31 is a block diagram showing a control configuration of a driving source control section 404" and a transmission capacity control section 405'. Driving source control section 404" includes a target motor rotational speed calculating section 4041', a rotational speed feedback control section 4042' and a torque-current signal conversion section 4043'. Transmission capacity control section 405' receives a torque command (corresponding to the actual motor generator torque) outputted from rotational speed feedback control section 4042' and a desired torque (the target motor generator torque of motor generator MG calculated based on the desired torque, and the target engine torque). Transmission capacity control section 405' calculates the target transmission capacity by the PI control based on the deviation between the desired torque and the actual motor generator torque.

The target transmission capacity is calculated by product of a basic value (the desired torque which is set in accordance with sum of the target motor generator torque and the target engine torque) and the correction factor (rate). This correction factor is set by a deviation (e) between the actual torque (sum of the target engine torque corresponding to the actual engine torque, and the torque command corresponding to the actual motor torque) and so on. This correction factor is set to decrease as the deviation (e) increases.

This calculated target transmission capacity is outputted to CVT controller 7 which is a hydraulic pressure control section configured to control a hydraulic pressure of one of primary pulley PP and secondary pulley SP which becomes the capacity side to bring belt VB, and pulleys PP and SP to the predetermined slip state.

CVT controller 7 calculates, from the inputted values, the secondary hydraulic pressure command, the line pressure command value which becomes the primary hydraulic pressure, and the step motor command. CVT controller 7 controls belt-type continuously-variable transmission CVT by these calculated command values.

The target motor generator rotational speed calculating section 4041' calculates the target motor generator rotational speed by multiplying the desired slip rate (1.02 when the slip rate of 2% is desired to be obtained) and the product of the secondary pulley actual rotational speed and the actual transmission gear ratio calculated based on the groove width (which represents the belt winding diameter which is a diameter of the belt wound around the pulley). In this case, the product of the secondary pulley actual rotational speed and the actual transmission gear ratio calculated based on the groove width is the primary pulley rotational speed (the engine speed) when the slip is not utterly generated. By multiplying the desired slip rate (1.02 corresponding to 2%) and the product of the secondary pulley actual rotational speed and the actual transmission gear ratio calculated based on the groove width, it is possible to obtain the desired slip state between the pulley and the belt.

Rotational speed feedback control section 4042' calculates the motor generator torque by the PI control based on the deviation between the calculated target motor generator rotational speed and the sensed actual motor generator rotational speed. That is, when the motor generator rotational speed does not reach (is smaller than) the target motor generator rotational speed, rotational speed feedback control section 4042' outputs the command to increase the motor generator torque. When the motor generator rotational speed exceeds (is greater than) the target motor generator rotational speed, rotational speed feedback control section 4042' outputs the command to decrease the motor generator torque. That is, the motor generator torque is controlled to attain the target motor generator rotational speed. The motor generator torque is not directly the controlled object. The motor generator torque is indirectly controlled.

[Slip Control Operation] Next, the slip control operation which brings the belt-type continuously-variable transmission to the predetermined slip state is illustrated. In general, in the belt-type continuously-variable transmission, the slip between the pulley and the belt is prohibited. The hydraulic pressure is produced to generate a pulley pressing force which does not cause the slip (hereinafter, referred to as a cramp hydraulic pressure). In addition to the cramp hydraulic pressure, the hydraulic pressure for the shift (shift hydraulic pressure) is generated. The pressing force necessary for the pulley is determined by a product of the hydraulic pressure and the area. In the hydraulic system in which the line pressure is always supplied to the secondary pulley in the first embodiment, the effective pressure receiving area of the primary pulley is set different from the effective pressure receiving area of the secondary pulley (specifically, the effective pressure receiving area of the primary pulley is set to about double the effective pressure receiving area of the secondary pulley). With this, the slip on the secondary pulley's side is prevented, and the larger pressing force is acted to the primary pulley so as to perform the shift (to vary the transmission gear ratio).

However, it was understood (confirmed) that the frictional coefficient when the slip rate is about 2% is larger than the frictional coefficient when the slip rate is near (almost) zero by experiment of the frictional coefficient and the slip rate acted between the pulley and the belt. That is, it was understood (confirmed) that the torque transmitting efficiency when the control operation is performed to generate the slight slip between the pulley and the belt is larger than the torque transmitting efficiency when the control operation is performed to completely suppress the slip between the pulley and the belt.

In the general belt-type continuously-variable transmission, the clamp pressure is set to a hydraulic pressure higher than the hydraulic pressure at which the slip is not generated in view of the security (factor), as mentioned above. However, it is preferred that the slip is generated in a measure (to some extent), as mentioned above. Accordingly, the clamp pressure must not be set to a higher value. That is, in this embodiment, the hydraulic pressure is controlled to a hydraulic pressure to bring the desired slip state, and consequently it is possible to improve the frictional coefficient of the belt-type continuously-variable transmission by setting the line pressure to a value considerably smaller than the line pressure which was thought to be necessary for the belt-type continuously-variable transmission. The efficiency of the belt-type continuously-variable transmission is deteriorated by the load of the oil pump. Therefore, the decrease of the load of the oil pump is considerably attractive (preferred). At the same time, it is possible to increase the frictional coefficient between the pulley and the belt.

Accordingly, it is considered that it is possible to obtain the desired slip rate, to decrease the load of the oil pump, and to improve the frictional coefficient if the clamp pressure (transmission capacity) of the belt-type continuously-variable transmission is set in accordance with the slip rate. However, in a control configuration (hereinafter, referred to as a hydraulic pressure adjusting type) in which the clamp pressure is adjusted in accordance with the deviation (difference) between the actual slip rate and the desired slip rate, there is caused a problem described below.

FIG. 6 is a time chart when a hydraulic pressure adjusting type is employed. It may be considered that the transmission capacity in FIG. 6 is the hydraulic pressure on the capacity's side. For example, it may be considered that the transmission capacity is the line pressure or the secondary pressure. Moreover, the transmission capacity is set to increase as the torque inputted to the belt-type continuously-variable transmission increases.

Initial conditions are that the accelerator opening by the driver is constant, and that the desired belt slip is obtained. When the driver depresses the accelerator pedal, the engine torque and the motor torque increase. At the same time, the transmission capacity increases. That is, the secondary pulley hydraulic pressure increases. In this case, when the increase of the input torque which is the sum of the engine torque and the motor generator torque is greater than the increase of the transmission capacity, the actual slip rate decreases below the desired slip rate. Accordingly, the controller outputs the command so as not to extremely increase the transmission capacity for increasing the actual slip rate. With this, the rate of the increase of the input torque becomes greater than the rate of the increase of the transmission capacity, and the actual slip rate shifts from the decrease to the increase. The actual slip increases above the desired slip rate in an overshoot manner. Therefore, the transmission capacity is increased beyond the input torque (the desired torque) to decrease the overshooted actual slip rate.

In a case in which the secondary pulley hydraulic pressure is controlled in this way by the hydraulic control, the response delay from the control command to varying the capacity is large. Accordingly, it was difficult to stably produce the desired slip rate. It is attractive (preferred) that the frictional coefficient increases by obtaining the desired slip rate. However, when the excessive slip rate is generated, the contact surfaces between the pulley and the belt may be broken, and the belt may be broken.

Therefore, it is conceivable that the slip rate control is not performed by the hydraulic pressure control, and that the slip rate control is performed by controlling the torque inputted to the belt-type continuously-variable transmission to obtain the desired slip state. In this case, when the driver depresses the accelerator pedal to increase the input torque, the slip rate increases. Therefore, the motor generator torque is adjusted to decrease. Motor generator MG has high response with respect to the control command, and accordingly the slip rate can be quickly converged to the desired slip rate. With this, the slip rate can be stably converged to the desired slip rate.

However, when the slip rate is extremely large, the command to decrease the engine torque is outputted so as to decrease the engine speed. That is, the actual torque becomes smaller than the driving force (desired torque) desired by the driver and so on in accordance with the reduction of the torque, so that the driver feels the uncomfortable feeling.

Therefore, in this example, the transmission capacity is outputted in accordance with the deviation (difference) between the desired torque and the actual torque, to belt-type continuously-variable transmission CVT. For example, when the torque command is smaller than the desired torque, the high transmission capacity is outputted. Consequently, the pulley pressing force increases, and it is difficult to generate the slip between the belt and the pulley. In the motor generator, it is necessary to increase the motor generator rotational speed since the slip is not obtained. Accordingly, the motor generator torque is increased. That is, when the transmission capacity is increased, the torque of motor generator MG whose the rotational speed is controlled is controlled to increase. Therefore, it is possible to attain the desired torque, and to also obtain the stable slip rate.

Figure 32:
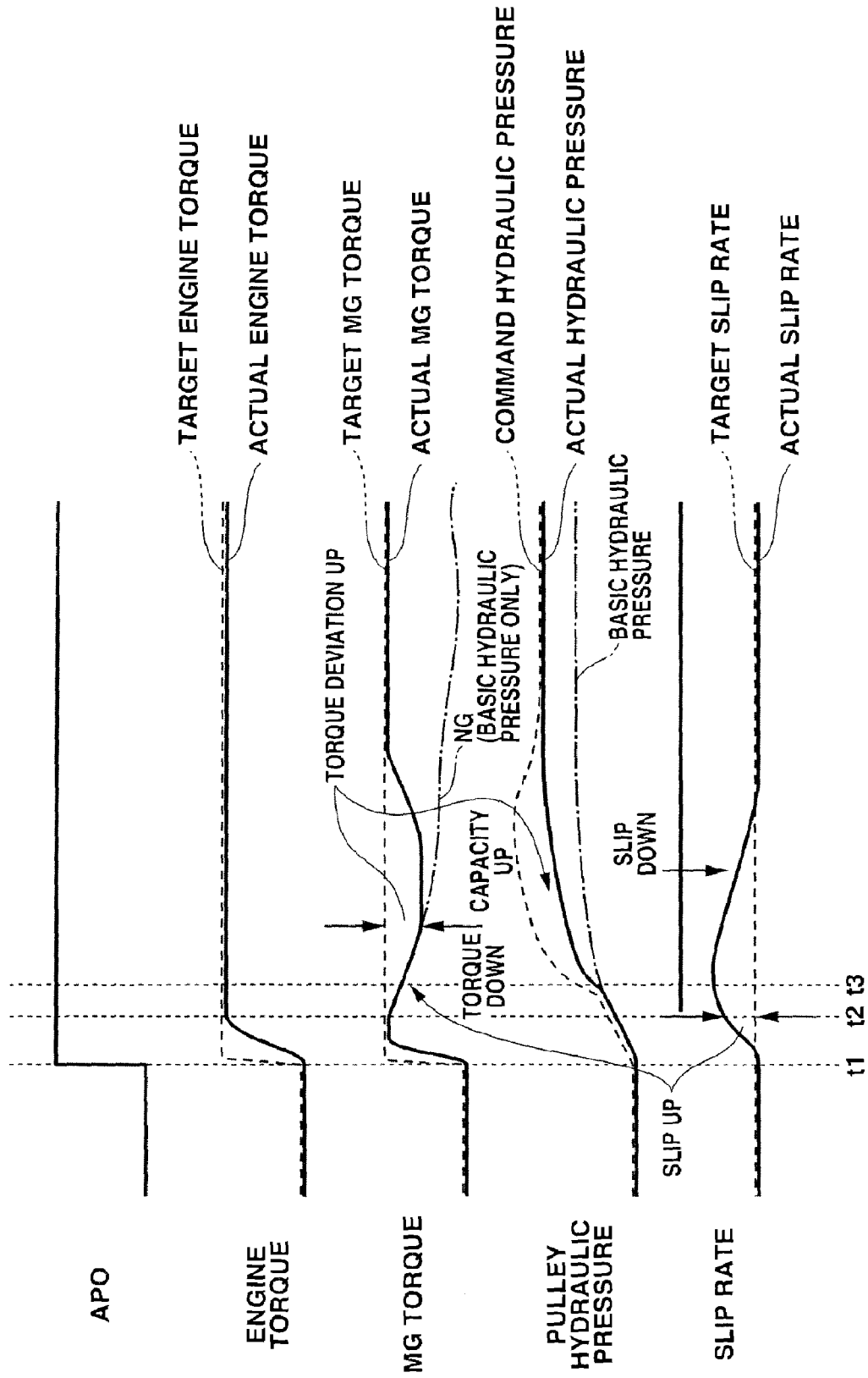
FIG. 32 is a time chart showing a slip rate control operation in the sixteenth embodiment.

FIG. 32 is a time chart showing a slip rate control operation of the sixteenth embodiment. In a steady running state in which the accelerator opening is constant, target motor rotational speed calculating section 4041' calculates the target motor generator rotational speed to obtain the predetermined slip rate. The motor generator torque is controlled so as to attain this target motor generator rotational speed. The engine torque is set in accordance with the desired driving force calculated based on the accelerator opening and so on. Accordingly, the engine torque is substantially constant. At time t1, when the driver depresses the accelerator pedal to increase the accelerator opening APO, the target engine torque and the target motor generator torque are varied to increase. In this case, the sum (the desired torque) of the target engine torque and the target motor generator torque is the torque inputted to belt-type continuously-variable transmission CVT. A basic pulley hydraulic pressure (hereinafter, referred to as a basic hydraulic pressure) is set based on the desired torque.

At time t2, when the slip rate becomes equal to or greater than the predetermined target slip rate (for example, 2%), the rotational speed of the motor generator is greater than the target motor generator rotational speed. For suppressing this increase of the slip rate, in the motor generator, the feedback control of the rotational speed of the motor generator is performed so as to decrease the rotational speed. Consequently, the torque of the motor generator decreases, and the increase of the slip rate is gradually decreased. In this case, the actual motor generator torque becomes smaller than the target motor generator torque of motor generator MG. That is, a deviation between the torque command (the actual motor generator torque) based on the rotational speed feedback control and the desired toque (the target motor generator torque) is generated.

At time t3, transmission capacity control section 405' varies the transmission capacity in accordance with the torque deviation. Specifically, the command pulley hydraulic pressure is varied to increase the pulley hydraulic pressure in accordance with the torque deviation. In the sixteenth embodiment, the command hydraulic pressure is increased by varying the correction factor (rate). Consequently, the slip rate optimizing operation (function) by the motor generator MG and the torque optimizing operation (function) by the increase of the pulley hydraulic pressure are compensated each other, and the actual slip rate is quickly converged to the target slip rate. The torque corresponding to the desired torque is quickly outputted to the driving wheels, and the driver does not feel the uncomfortable feeling.

In a case in which the only motor generator rotational speed feedback control is employed and the torque feedback control by the transmission capacity control section 405' is not employed as shown by a chain line in FIG. 32, the pulley hydraulic pressure is controlled only by the basic hydraulic pressure. In this case, it is necessary to continuously decrease the motor generator torque until the slip rate is converged. The desired torque is not outputted, and the driver may feel the uncomfortable feeling (cf. FIG. 32). On the other hand, in the sixteenth embodiment, the slip rate is suppressed by the rotational speed feedback control of the motor generator having the high responsiveness. The decrease of the driving torque by the rotational speed feedback control by the motor generator is controlled by the torque feedback control to increase the transmission capacity of the belt-type continuously-variable transmission CVT. Accordingly, it is possible to quickly converge the slip rate, and also to attain the desired torque automatically and stably, in accordance with the increase of the transmission capacity.

As mentioned above, the control apparatus according to the sixteenth embodiment can attain the following advantageous effects.

(14) The belt continuously-variable transmission control apparatus includes a belt continuously-variable transmission CVT including a primary pulley PP arranged to receive a torque of engine E and/or motor generator MG (driving source), a secondary pulley SP arranged to output the torque to the driving wheels, and a belt VB wound around the two pulleys PP, SP; a CVT controller (hydraulic pressure control section) 7 configured to control a hydraulic pressure of one of the pulleys PP, SP which becomes the capacity side, and to bring the belt VB and the two pulleys PP, SP to a slip state; and a rotational speed feedback control section (torque control section) 4042' configured to control (adjust) the torque of the engine and/or motor generator (driving source) MG, and thereby to bring the slip state to the predetermined slip state. That is, the predetermined slip between the pulley and the belt is generated, and accordingly it is possible to decrease the necessary hydraulic pressure. Moreover, it is possible to suppress the excessive belt slippage by adjusting the input torque, without increasing the hydraulic pressure.

(15) Accordingly, it is possible to increase the responsiveness by adjusting the input torque by motor generator (motor) MG, and also to attain the stable slip rate.

(16) The transmission capacity (the hydraulic pressure of one of the two pulleys which becomes the capacity side) is set in accordance with the deviation between the desired torque and the command torque (actual torque). Accordingly, it is possible to attain the desired torque desired by the driver and so on, and also to obtain the stable slip state.

(17) The belt continuously-variable transmission control apparatus includes a belt continuously-variable transmission CVT including a primary pulley PP arranged to receive a torque of engine E and/or motor generator (driving source) MG, a secondary pulley SP arranged to output the torque to the driving wheels, and a belt VB wound around the two pulleys PP, SP; a target motor rotational speed calculating section (target rotational speed calculating section) 4041' arranged to calculate the target rotational speed of motor generator (driving source) MG to bring the belt VB, and the pulleys PP and SP to the predetermined slip state; a rotational speed feedback control section (the rotational speed control section) 4042' configured to control the motor generator MG to the target rotational speed; a transmission capacity control section (capacity side pulley pressure setting section) 405' configured to perform the feedback control to set the hydraulic pressure of one of the pulleys which becomes the capacity side, in accordance with the deviation between the desired torque and the actual torque of the motor generator MG; and a CVT controller (the shift control section) 7 configured to control the pressing forces of the two pulleys based on the capacity side pulley hydraulic pressure, and thereby to obtain the desired transmission gear ratio. Accordingly, it is possible to obtain the effects (14), (15) and (16). Moreover, the transmission capacity (the hydraulic pressure of one of the pulleys which becomes the capacity side) is set in accordance with the deviation between the desired torque and the command torque (the actual torque). Accordingly, it is possible to attain the desired torque desired by the driver and so on, and to obtain the stable slip state.

The entire contents of Japanese Patent Application No. 2008-321749 filed Dec. 18, 2008 and Japanese Patent Application No. 2009-278116 filed Dec. 8, 2009 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A belt continuously-variable transmission control apparatus comprising:
   a belt continuously-variable transmission including:
      a primary pulley arranged to receive a torque from a driving source;
      a secondary pulley arranged to output the torque to driving wheels; and
      a belt wound around the primary pulley and the secondary pulley;
   a hydraulic pressure control section configured to control a hydraulic pressure of one of the primary pulley and the secondary pulley which is a capacity side, and thereby to bring the belt, the primary pulley and the secondary pulley to a slip state; and
   a torque control section configured to control the torque of the driving source, and thereby to bring the slip state to a predetermined slip state.

2. The belt continuously-variable transmission control apparatus as claimed in claim 1, wherein the driving source is an engine.

3. The belt continuously-variable transmission control apparatus as claimed in claim 1, wherein the torque control section is configured to control an ignition timing for a high response component of the torque of the driving source, and to control an intake quantity for a low response component of the torque of the driving source.

4. The belt continuously-variable transmission control apparatus as claimed in claim 1, wherein the driving source is a motor.

5. The belt continuously-variable transmission control apparatus as claimed in claim 1, wherein the torque control section is configured to control the torque of the driving source so that a rotational speed of the driving source becomes a rotational speed corresponding to the predetermined slip state.

6. The belt continuously-variable transmission control apparatus as claimed in claim 1, wherein the hydraulic pressure control section is configured to control a hydraulic pressure of one of the first pulley and the secondary pulley which becomes a capacity side, in accordance with a deviation between a desired torque and an actual torque of the driving source.

7. The belt continuously-variable transmission control apparatus as claimed in claim 6, wherein the hydraulic pressure control section is configured to control by using a torque obtained by subtracting an inertia of the driving source from the actual torque.

8. The belt continuously-variable transmission control apparatus as claimed in claim 1, wherein the torque control section is configured to have an upper limit value of the torque of the driving source which corresponds to a desired torque.

9. The belt continuously-variable transmission control apparatus as claimed in claim 1, wherein the torque control section is configured to have a lower limit value of the torque of the driving source which corresponds to a desired torque.

10. The belt continuously-variable transmission control apparatus as claimed in claim 1, wherein the torque control section is configured (i) to cause the slip state so that a speed of the belt is larger than a speed of the secondary pulley when a transmission gear ratio is at a high transmission gear ratio side relative to 1 during an acceleration, (ii) to cause the slip state so that the speed of the belt is smaller than the speed of the secondary pulley when the transmission gear ratio is at a high transmission gear ratio side relative to 1 during a deceleration, (iii) to cause the slip state so that the speed of the belt is smaller than a speed of the primary pulley when the transmission gear ratio is equal to or at a low transmission gear ratio side relative to 1 during the acceleration, and (iv) to cause the slip state so that the speed of the belt is larger than the speed of the primary pulley when the transmission gear ratio is equal to or at a low transmission gear ratio side relative to 1 during the deceleration.

11. A belt continuously-variable transmission control apparatus comprising:
   a belt continuously-variable transmission including:
      a primary pulley arranged to receive a torque from a driving source;
      a secondary pulley arranged to output the torque to driving wheels; and
      a belt wound around the primary pulley and the secondary pulley;
   a target rotational speed calculating section configured to calculate a target rotational speed of the driving source to bring the belt and one of the primary pulley and the secondary pulley to a predetermined slip state;
   a rotational speed control section configured to control a rotational speed of the driving source to the target rotational speed;
   a capacity side pulley pressure setting section configured to set a hydraulic pressure of one of the primary pulley and the secondary pulley which is a capacity side, in accordance with a deviation between a desired torque and an actual torque of the driving source; and
   a shift control section configured to control a pressing force of the primary pulley and a pressing force of the secondary pulley based on the hydraulic pressure of the one of the primary pulley and the secondary pulley of the capacity side, and thereby to obtain a desired transmission gear ratio.

* * * * *